United States Patent
Tian et al.

(10) Patent No.: US 6,879,709 B2
(45) Date of Patent: Apr. 12, 2005

(54) SYSTEM AND METHOD FOR AUTOMATICALLY DETECTING NEUTRAL EXPRESSIONLESS FACES IN DIGITAL IMAGES

(75) Inventors: Ying-Li Tian, Mount Kisco, NY (US); Rudolf M. Bolle, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/051,595

(22) Filed: Jan. 17, 2002

(65) Prior Publication Data

US 2003/0133599 A1 Jul. 17, 2003

(51) Int. Cl.⁷ .................................................. G06K 9/00
(52) U.S. Cl. ........................ 382/118; 382/170; 382/173; 382/190; 382/199; 340/5.83
(58) Field of Search ................................. 352/103, 107, 352/100, 115, 117, 118, 168, 170, 173, 181, 190, 199, 209, 254, 276, 165; 356/71; 340/5.82, 5.83

(56) References Cited

U.S. PATENT DOCUMENTS

| | | | | |
|---|---|---|---|---|
| 5,164,992 A | * | 11/1992 | Turk et al. ................... 382/118 |
| 5,410,609 A | * | 4/1995 | Kado et al. ................... 382/118 |
| 6,009,210 A | * | 12/1999 | Kang ............................ 382/276 |
| 6,400,835 B1 | * | 6/2002 | Lemelson et al. ........... 382/118 |
| 6,556,196 B1 | * | 4/2003 | Blanz et al. ................. 345/419 |
| 6,807,290 B1 | * | 10/2004 | Liu et al. ..................... 382/118 |

OTHER PUBLICATIONS

Computer Recognition of Human Faces by Takeo Kanade, pp. 47–63.

Manual for the Facial Action Coding System by Paul Ekman, Ph.D. and Wallace V. Friesen, Ph.D., (Paul Ekman, 1978) pp. 1–6.

(Continued)

*Primary Examiner*—Bhavesh M. Mehta
*Assistant Examiner*—Sheela Chawan
(74) *Attorney, Agent, or Firm*—Louis J Percello

(57) ABSTRACT

A system and method for automatic detecting neutral expressionless faces in digital images and video is described. First a face detector is used to detect the pose and position of a face and find the facial components. Second, the detected face is normalized to a standard size face. Then a set of geometrical facial features and three histograms in zones of mouth are extracted. Finally, by feeding these features to a classifier, the system detects if there is the neutral expressionless face or not.

38 Claims, 18 Drawing Sheets

OTHER PUBLICATIONS

Recogizing Human Facial Expressions from Long Image Sequences Using Optical Flow by Yaser Yacoob and Larry S. Davis, IEEE Transactions on Patern Analysis and Machine Intelligence, vol. 18, No. 6, Jun. 1996, pp. 636–642.

Classifying Facial Actions by Gianluca Donato, Stewart Bartlett, Joseph C. Hager, Paul Ekman and Terrence J. Sejnowski, IEEE Transactions on Pattern Analysis and Machine Intelligence, vol. 21, No. 10, Oct. 1999, pp. 974–989.

Recognizing action Units for Facial Expression Analysis by Ying–li Tian, Memer, IEEE, Takeo Kanade, Fellow, IEEE and Jeffrey F. Cohn, Member, IEEE, IEEE Transactions on Pattern Analysis and Machine Intelligence, vol. 23, No. 2, Feb. 2001, pp. 97–115.

Computer Vision by Dana H. Ballard and Christopher M. Brown, pp. 68–70, pp. 75–80.

Human Face Detection in Visual Scenes by Henry A. Rowley, Shumeet Baluja and Takeo Kanade, Nov. 1995, pp. 1–24.

Recognizing Faces Showing Expressions by Yaser Yacoob Heung–Man Lam and Larry S. Davis (To appear in International Workshop on Automatic Face–and Gesture–Recognition.

Learning Human Face Detection in Cluttered Scenes by Kah–Kay Sung and Tomaso Poggio (to appear in prco. 6th Intl. Conf. CAIP' 95, Prague, Czech Republic, pp. 1–8.

Color Indexing (Using Color As A Reference Index) by Michael J. Swain, Dana H. Ballard, International Journal of Computer Vision, 7:1, 11–32 (1991), 1991 Kluwer Academic Publishers, Manufactured in The Netherlands.

Proceedings of the Fourth International Joint Conference on Pattern Recognition by Motoi Suwa, Noboru Sugie and Keisuke Fujimura, Nov. 7–10, 1973, Kyoto, Japan, Sponsored by the International Association for Pattern Recognition (IAPR): an Affiliate Member of IFIP, pp. 408–411.

* cited by examiner

Neutral expression

No expression

Happy, 330

Sad, 340

Surprise, 350

Disgust, 360

Fear, 370

Anger, 380

SYSTEM AND METHOD FOR AUTOMATICALLY DETECTING NEUTRAL EXPRESSIONLESS FACES IN DIGITAL IMAGES

FIELD OF THE INVENTION

This invention relates to the field of processing and interpreting of digital images and video that contain human faces. More specifically, this invention relates to the detection, recognition and facial expression classification of the appearances of human faces in digital images and video.

BACKGROUND OF THE INVENTION

A neutral expressionless face is a relaxed face without contraction of facial muscles and without facial movements. It is the state of people's face most of the time. The appearance of a neutral face is needed for all existing automated facial expression analysis systems. That is, to classify a a facial expression, a generic automated neutral expressionless face appearance is needed and provided by a human operator. Face expression classification then, in general, has three stages: (i) face detection and normalization; (ii) facial feature extraction and representation; and (iii) comparison of the feature representation to a feature representation of the hand-annotated neutral face appearance. In addition, compared to enrolling a face with dramatic expressions in a face based person authentication system, the performance of such face based authentication systems can be much improved by enrolling and authenticating neutral faces.

Face detection and normalization are often used techniques in the general area of image and video processing. Face detection is the first step of many face recognition systems. Face detection is also the first step in facial expression analysis for (say) human-computer interaction. A face detection system finds positions and scales of the faces in images and videos. A robust face detector flexibly and reliably detects the face in the image or video, regardless of lighting conditions, background clutter in the image, multiple faces in the image, as well as variations in face position, scale, pose and expression.

The accurate detection of human faces in arbitrary scenes is the most important process involved. The face component template, skin color, contour, eigenfaces (U.S. Pat. No. 5,164,992 to Turk and Pentland), and other features can be used for face detection. Many face detectors have been developed in past 20 years. Some example algorithms for locating faces in images can be found in (Sung and Poggio) and (Rowley, Baluja, and Kanade).

Kah-Kay Sung and T. Poggio. Learning human face detection in cluttered scenes. In *Computer Analysis of Images and Patterns*, pages 432–439, 1995. (Sung and Poggio)

Henry A. Rowley, Shumeet Baluja, and T. Kanade. Human face detection in visual scenes. *Technical Report* CMU-CS-95-158, School of Computer Science, CMU, Pittsburgh, Pa., July 1995. (Rowley, Baluja, and Kanade)

These references are incorporated by reference in its entirety.

Oftentimes, face normalization is a necessary preprocessing step for face recognition and facial expression analysis. Generally, the face appearance images encompass a great deal of variance in position, scale, lighting because of body and/or head motion, and lighting changes because of environment changes. Thus, it is necessary to compensate or normalize a face for position, pose, scale, and illumination so that the variance due to the above mentioned causes is minimized.

Furthermore, expression and facial detail changes result in changes in the face appearance images and these changes also somehow have to be compensated for.

After the face detection and localization stage there is the face normalization stage. Here the eyes, the nose or the mouth are identified using direct image processing techniques (such as template matching, see below). Assume for now that the line segment between the eyes is known and that the exact location for the nose tip is available. The detection of the location of these feature points (eyes, nose, and mouth) gives an estimate of the pose the face. Once the 2D pose or the 3D position and orientation of the face is known, it is possible to revert the effect of translation and rotation and synthesize a standardized, frontal view of the individual. Furthermore, the position of the feature points allow for a rough segmentation of the contour of the face to discard distracting background information. Once segmented, a color histogram of the face alone can be computed to compensate for lighting changes in the image by transforming the color histogram to some canonical form.

If faces could be exactly detected and located in the scene, the techniques for face authentication, face recognition, or facial expression analysis can be readily applied to these detected face. Face authentication systems verify the identity of particular people in real-time (e.g., in a security monitoring system, location tracking system, etc.), or allow access to some resource to a selected group of enrolled people and deny access to all others (e.g., access to a building, computer, etc.). Multiple images per person are often available for training and real-time identification is, of course, a necessity.

Compared to the problem of face authentication, face recognition/identification is a much more complex problem. Given an image of human face, a face recognition system compares the face appearance to models or representations of faces in a (possibly) large database of identities (e.g., in a police database of mugshots) and reports the identity of the face if a match exists. These systems typically return a list of the most likely matches in the database. Often only one image is available per person. For forensic applications like mugshot searches, it is usually not necessary for face identification to be done in real-time. For background check, for example, on points of entry or exit such as airports, immediate responses are required.

The techniques for face identification can be categorized as either feature-based (geometric) or template-based/appearance-based (photometric), where the latter has proven more successful. Template-based or appearance-based methods use measures of facial similarity based on standard Euclidean error norms (that is, template matching) or subspace-restricted error norms (e.g., weighted eigenspace matching), see U.S. Pat. No. 5,164,992 to Turk and Pentland. The latter technique of "eigenfaces" has in the past decade become the "golden standard" to which other algorithms are often compared.

Facial expressions are one of the most powerful, natural, and immediate means by which human beings communicate their emotions and intentions. The human face expresses emotions faster than people verbalize or even realize their feelings. Many psychologists have been studying human emotions and facial expressions and found that the same expression might have radically different meanings in different cultures. However, it is accepted by 20th century psychologists that six universal expressions (i.e., happiness, sadness, disgust, anger, surprise, and fear) are not changing too much for different cultures. In addition, Ekman and Friesen have developed a Facial Action Coding System (FACS) to describe facial behavior in term of its constituent muscle actions. The details about FACS can be found in (Ekman & Friesen)

P. Ekman and W. V. Friesen, Facial Action Coding System: A Technique for the measurement of Facial Movement. Palo Alto, Calif.: Consulting Psychologists Press, 1978. (Ekman & Friesen)

This reference in incorporated by reference in its entirety.

In the past decade, much progress has been made to build computer systems that understand and use this natural form of human communication for human-computer interaction. Most of the facial expression analysis systems focus only on the six universal expressions. Recently, some researchers have been working on more subtle facial expression movements based on the Facial Action Coding System from Ekman and Friesen. Facial expression analysis systems have applications in retail environments (happy and unhappy customers), human computer interaction (e.g., the computer reacts to the user's frame of mind), lie detection, surveillance and image retrieval.

Facial feature extraction and building a face representation are important aspects of the field of processing of images and video that contain faces. Multiscale filters, that operate at multiple levels of resolution, are used to obtain the pre-attentive features (features such as edges and small regions) of objects. Based on these features, different structural face models have been investigated to locate the face and facial features, such as eyes, nose and mouth. The structural models are used to characterize the geometric pattern of the facial components. These models, which are texture and feature models, are used to verify the face candidate regions detected by simpler image processing operations. Since the eyeballs (or pupils) are the only features that are salient and have strong invariant property, the distance between these is often used to normalize face appearances for recognition purposes. Motivated by this fact, with the face detected and the structural information extracted, a precise eye localization algorithm is applied using contour and region information. Such an algorithm detects, ideally with a sub-pixel precision, the center and the radius of the eyeballs in the face image. The localized eyes now can be used for an accurate normalization of images, which greatly reduces the number of possible scales that need to be used during the face recognition process. The work by Kanade (Kanade) was the first to present an automatic feature extraction method based on ratios of distances and reported a recognition rate of between 45–75% on a database of 20 people.

T. Kanade, "Picture Processing by Computer Complex and Recognition of Human Faces," PhD Thesis, Kyoto University, 1973. (Kanade)

This reference in incorporated by reference in its entirety.

Different facial features have been used for facial image processing systems, for example, face characteristic points, face components, edges, eigenfaces (U.S. Pat. No. 5,164,992 to Turk and Pentland), histograms, and so on.

Face characteristic points are the location of face components. For example, inner corners, of the eyebrows, inner corners of the eyes, outer corner of the eyes, center of nose, lip corners.

Edge detection refers to a class of technologies to identify sharp discontinuities in the intensity profile of images. Edge detectors are operators that compute differences between pairs of neighboring pixels. High responses to these operators are then identified as edge pixels. Edge maps can be computed in a single scan through the image. Examples of edge detection are the Gradient- and Laplacian-type edge finders and edge templates such as Sobel.

Gradient- and Laplacian-type edge finders and edge templates are described more fully in D. Ballard and C. Brown, Computer Vision, Prentice-Hall: N.J., 1982, pages 75–80. (Ballard and Brown a). A histogram is common terminology for a uni-variate (i.e., one-variable) distribution, or, better said, a probability mass distribution. That is, a histogram accumulates the relative frequencies of values of this variable in a one-dimensional array. Several types of histograms can be constructed: categorical, continuous, difference, and comparative. Details of each type of histogram can be found in M. Swain and D. Ballard, "Color indexing," International Journal of Computer Vision, Vol. 7, No. 1, pp. 11–32, 1991. This reference is incorporated by reference in its entirety.

To determine a histogram for a set of variables measured on a continuous scale, divide the range (the scale) between the highest and lowest value into several bins of equal size. Then increment by 1 the appropriate bin of the histogram for each quantized value in the set. (Each quantized value is associated with one of the histogram bins.) The number in each bin of this frequency histogram represents the number of quantized values in the original set.

Template matching is a general method for localizing and/or recognizing objects. In template matching, a template image represents the object, which is to be located in a one or more target images. This is achieved by matching the template image to all (or many) of the possible locations it could appear in the target image. A distance function (typically a simple Euclidean distance) is applied to the template and the image portion covered by the template to measure the similarity of the template and the image at a given location. The matching algorithm then picks the location with smallest distance as the location of the template image in the target image.

There are several variations to this basic algorithm. A first one is the use of more sophisticated distance functions. This may be necessary for images, which have different overall brightness than the template image or varying brightness. Another set of variations attempts to reduce the number of possible locations which are actually matched. One such method is to use image pyramids. Another method is to only match every few pixels, and then for promising match locations, attempt to match all the pixels in the neighborhood.

Template matching (often also referred to as correlation or normalized correlation), is described fully in D. Ballard and C. Brown, Computer Vision, Prentice-Hall: N.J., 1982, pp. 68–70. (Ballard and Brown b). This reference is incorporated by reference in its entirety.

Classifiers play an important role in the analysis of images and video of human faces. For example, some classifier or several classifiers are used to classify the facial expression based on the extracted face features. To develop a procedure for identifying images or videos as belonging to particular classes or categories (or for any classification or pattern recognition task, for that matter), supervised learning technology can be based on decision trees, on logical rules, or on other mathematical techniques such as linear discriminant methods (including perceptrons, support vector machines, and related variants), nearest neighbor methods, Bayesian inference, neural networks, etc. We generically refer to the output of such supervised learning systems as classifiers.

Most classifiers require a training set consisting of labeled data, that is, representations of previously categorized media items (i.e., face appearances), to enable a computer to induce patterns that allow it to categorize hitherto unseen media items. Generally, there is also a test set, also consisting of labeled data, that is used to evaluate whatever specific categorization procedure is developed. In academic exercises, the test set is usually disjoint from the training set to compensate for the phenomenon of overfitting. In practice, it may be difficult to get large amounts of labeled data of high quality. If the labeled data set is small, the only way to get any useful results at all may be to use all the available data in both the training set and the test set.

To apply standard approaches to supervised learning, the media segments (face appearances) in both the training set and the test set must be represented in terms of numbers derived from the face appearances, i.e., features. The relationship between features extracted for the purposes of supervised learning and the content of a face image/video has an important impact on the success of the enterprise, so it has to be addressed, but it is not part of supervised learning per se.

From these feature vectors, the computer induces classifiers based on patterns or properties that characterize when a face image/video belongs to a particular category. The term "pattern" is meant to be very general. These patterns or properties may be presented as rules, which may sometimes be easily understood by a human being, or in other, less accessible formats, such as a weight vector and threshold used to partition a vector space with a hyperplane. Exactly what constitutes a pattern or property in a classifier depends on the particular machine learning technology employed. To use a classifier to categorize incoming hitherto unseen media segments, the newly arriving data must not only be put into a format corresponding to the original format of the training data, but it must then undergo a further transformation based on the list of features extracted from the training data in the training phase, so that it finally possesses a representation as a feature vector that permits the presence or absence of the relevant patterns or properties to be determined.

Classifying in an automated fashion whether a face has a neutral expression is an important problem. The ability to detect whether a face image is expressionless has, in general, many applications since it eliminates one complicated degree of freedom, the facial expression, from the face image analysis process. The ability of a system to detect a neutral face further directly implies that the system has the capability to detect if there is a dramatic expression on a face.

PROBLEMS WITH THE PRIOR ART

Face recognition systems and facial expression recognition systems can achieve high recognition rate for good quality, frontal view, constant lighting, and subtle expression or expressionless face images. The performance of face recognition system significantly decreases for side views, dramatic expressions on the face, and bad-lighting face images.

A typical prior art face recognition system is described in U.S. Pat. No. 5,164,992 to Turk and Pentland. A typical prior art face recognition system to recognize faces with different facial expressions is described in (Yacoob, Lam, and Davis). This reference in incorporated by reference in its entirety.

Y. Yacoob, H. Lam, and L. Davis, "Recognizing Face Showing Expressions," Proc. Int. Workshop Automatic Face and Gesture Recognition, 1995. (Yacoob, Lam, and Davis)

U.S. Pat. No. 5,164,992 to Turk and Pentland presents a face recognition scheme in which face images are projected onto the principal components of the original set of training images. The resulting eigenfaces are classified by comparison with known individuals. They present results on a database of 16 subjects with various head orientations and under different scale and lighting conditions. Their images appear identical otherwise with little variation in facial expression, facial details, pose, etc. For lighting, orientation, and scale variation their system achieves 96%, 85% and 64% correct classification, respectively. A problem with this prior art is that the recognition rates are highly dependent on the similarity of the enrolled and test face images, i.e., faces with the same expression and appearance. Another problem with this prior art is that the background significantly interferes with the recognition process.

The work (Yacoob, Lam, and Davis) compares the performance of face recognition on segmented faces with expressions to segmented neutral faces by using an eigenface-based approach and a feature-graph based approach. For both algorithms, it is observed that recognition performance degrades when the segmented face images have a dramatic, or different expressions compared to segmented face image with neutral expression. Automatic neutral face detection can find the neutral face (if a neutral face exists) or the nearest neutral face (if there is no a neutral face) from the video or images but it assumed here that the enrolled face has the neutral expression. Hence, a problem with this prior art is that it is assumed that a person's face is enrolled in a face recognition system with a neutral expression on the face. That is, there is no model developed in this work that captures and represents the neutral expression.

There are several patents on face identification and recognition that address the problem of faces with dramatic expressions. One such patent is U.S. Pat. No. 5,410,609 to Kado et al., it develops a system to identify individuals from facial characteristic points. An expressionless face of each individual is needed in this system. A total of 30 characteristic points on the face contour, eyebrows, eyes, nose, and mouth are used. A database of individuals wherein characteristic points of expressionless facial image are stored represents the enrolled population. Then for each input image, the differences between characteristic points in the current image and that in the expressionless images are calculated. In this system, two major problems exist. The first problem is that this face recognition system depends on the availability of an expressionless face image.

The second problem is that the characteristic points they use are difficult to reliably extract in real imagery. For example, face contours that are covered by hair cannot be extracted.

In the past decade, much progress has been made to build computer systems to understand and use the natural form of human communication through facial expression. Most of the facial expression analysis systems are focussed on the six universal expressions (happiness, sadness, disgust, anger, surprise, and fear). Recently, some researchers have addressed detection of subtle facial expression movements based on FACS (Facial Action Coding System). A problem is that all these current facial expression analysis algorithms need the neutral face to recognize facial expressions. No system can detect a neutral face automatically. All the neutral faces are manually labeled. Also for some video or image sequences, there is no neutral face. The facial expression analysis system will not work if no image or video of the neutral face is available.

Some prior art systems for facial expression analysis are (Suwa et al.), (Donado et al.), (Yacoob et al.), and (Tian et al.). A significant problem with all these techniques is the assumption that there is a neutral face available for each subject. Articles describing these systems are the following:

M. Suwa, N. Sugie, and K. Fujimora, "A Preliminary Note on Pattern Recognition of Human Emotional Expression," Proc. Int'l Joint Conf. Pattern Recognition, pp. 408–410, 1978. (Suwa et al.)

G. Donado, M. Bartlett, J. Hager, P. Ekman, and T. Sejnowski, "Classifying Facial Actions," IEEE Transactions on Pattern Analysis and Machine Intelligence, Vol. 21, No. 10, pp 974–989, October 1999. (Donado et al.)

Y. Yacoob and L. Davis, "Recognizing Human Facial Expression from Long Image Sequences Using Optical Flow," IEEE Transactions on Pattern Analysis and Machine Intelligence, Vol. 18, No. 6, pp.636–642, June 1996. (Yacoob et al.)

Yingli Tian, T. Kanade and J. F. Cohn, "Recognizing Action Units for Facial Expression Analysis", IEEE Transactions on Pattern Analysis and Machine Intelligence, Vol. 23, No. 2, pp. 97–115, February, 2001. (Tian et al.)

Suwa et al. present an early attempt to analyze facial expressions by tracking the motion of twenty identified spots in an image sequence of a facial image. The work by Yacoob and Davis uses optical flow to track the motion of the surface regions of facial features (eyebrows, eyes, nose, and mouth) to understand the basic expressions. Both Donado et al. and Tian et al. develop facial expression systems to recognize subtle facial expression changes based on FACS. Both of these systems assume that the neutral face expression is available. That is, both systems assume that the first frame of the sequence contains a neutral expressionless face.

A problem with the prior art of current user interfaces is that the interfaces do not adept or react to the user's emotional state because of the difficulties of facial expression analysis. A problem with prior art image/video retrieval techniques cannot search faces with specific expressions, again because of the difficulties of facial expression analysis.

These references are herein incorporated by reference in their entirety.

OBJECTS OF THE INVENTION

An object of this invention is to improve facial expression analysis and to allow the design of facial expression analysis systems to work without manual interference.

An object of this invention is a new system and method for detecting neutral expressionless faces in images and video, if neutral faces are present in the image or video.

An object of this invention is an new system and method for detecting faces close to expressionless faces in images and video, if there is no neutral face present in the image or video.

An object of this invention is to improve the performance of face recognition authentication and identification systems.

An object of this invention is to allow current computer user interfaces the use of automated facial expression analysis without calibrating such interfaces with the neutral face of the user.

An object of this invention is to allow image and video retrieval systems to automatically label facial expressions thereby facilitating retrieval based on facial expressions.

SUMMARY OF THE INVENTION

The present invention is a system and method for automatically detecting neutral expressions in (still or moving) digital images. The computer system has an image acquisition unit. A face detector receives input from the image acquisition unit and detects one or more face subimages of one or more faces in the image. A characteristic point detector receives input from the face detector and localizes and positions the face subimages with respect to a coordinate system and estimates characteristic facial features points in each detected face subimage. At least one of the facial features is the mouth of the face. A facial feature analyzer determines the shape of the mouth and a position of the mouth with respect to a reference in the coordinate system and creates a representation of the shape of the mouth and the position of the mouth. Finally, a face classification unit classifies the representation of each face subimage into one of a neutral class and a non-neutral class.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
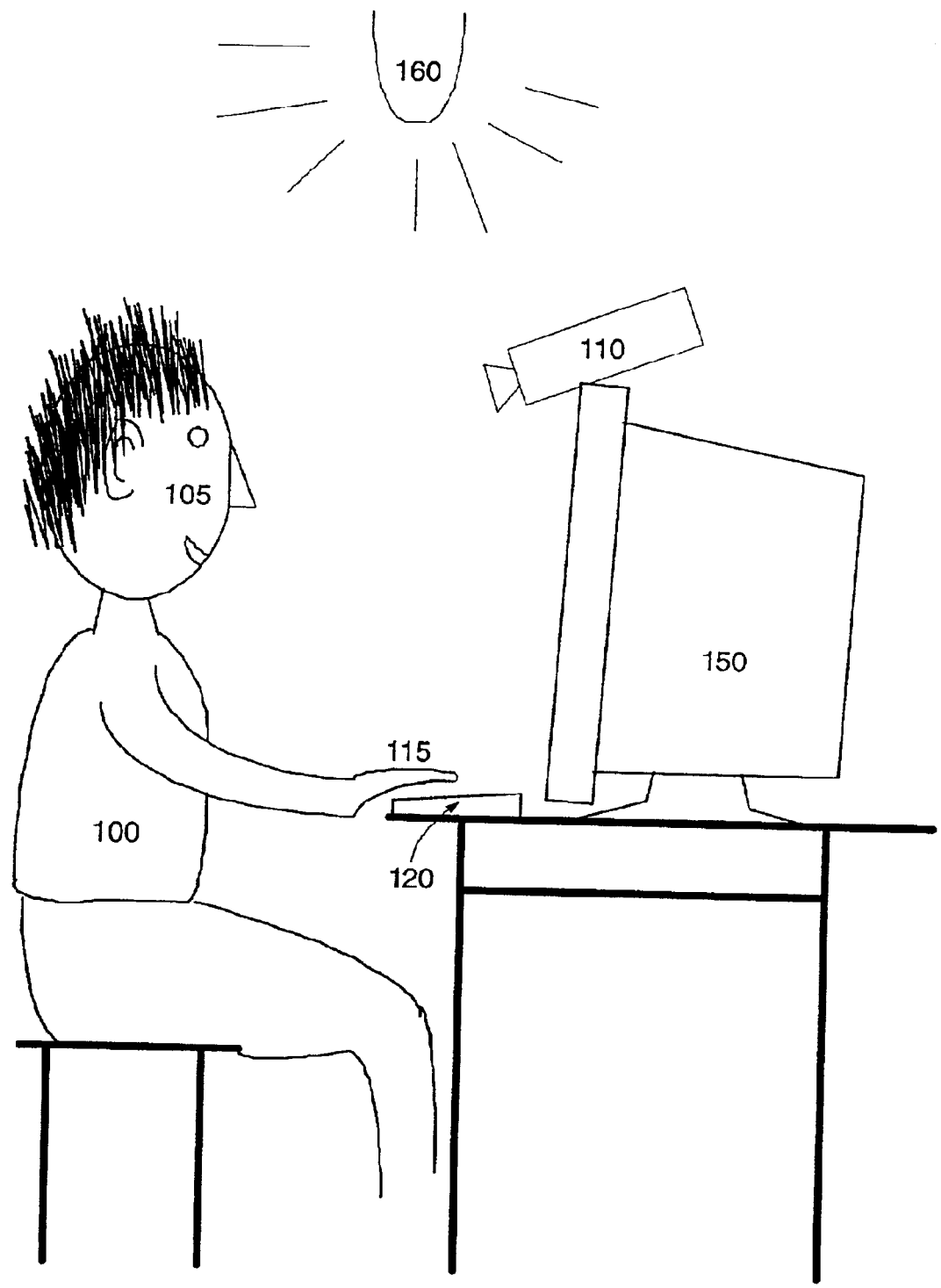
FIG. 1 is a drawing of a computer user where the computer has an attached camera that views the user's face.

Automatically detecting neutral, expressionless faces in digital images and video is important in several applications such as face recognition, facial expression analysis, user interfaces, image retrieval, and so on. However, no neutral face detector or neutral face classifier is known in the prior art. This invention describes a system and method for automatically detecting neutral expressionless faces in digital images and video, or for automatically classifying face images as expressionless. First, a prior art face detector is used to detect the pose and position of a face from an input image or video. A prior art system is then used to find the facial components (i.e., eyes, eyebrows, mouth) in the detected faces. Second, the detected face is normalized to a standard size face in canonical position. A set of geometrical facial features and three histograms in zones containing the mouth are then extracted. These geometric face features are the height of the left eye, the height of the right eye, the distance between the left corner of the mouth and the line segment connecting the eyes, the distance between the right corner of the mouth and the line segment connecting the eyes, and the width of the mouth. The three histograms are the shape histogram of the left portion of the mouth, the shape histogram of the middle portion of the mouth, and the shape histogram of the right portion of the mouth. Finally, by feeding these features to a classifier, the system detects if there is the neutral expressionless face.

Digital cameras are becoming cheaper, smaller and more and more abundant. Already, computers can be bought that include a digital camera as standard equipment. It can be expected that future computers will come equipped with multiple cameras. Environments, such as department stores or airports, are also rapidly being equipped with cameras. These cameras are controlled, or will be controlled, by computers. In addition, many of these cameras will have pan, tilt and zoom capabilities that can be controlled by computers. Consequently, multiple video streams of objects in the environment, viewed from different directions at various resolutions, will be available in real time and in parallel.

Computational power, storage capacity, input/output speeds and network speeds are all also rapidly increasing. This will make it possible to automatically process and interpret these many video streams in real time. Applications of these technologies are plenty; among these applications are surveillance and "attentive computing." The latter includes, among other things, the use of these cameras to aid people in the environment (computer users, customers) in their productivity and overall experience and the aid to the owner of the environment in operating the environment effectively and safely. Examples are personalization of the environment based on the visual identification of a person and recognizing premier or undesirable customers in retail environments.

Attentive computing also refers to the ability of the environment to computationally react and adept to a person's emotional state or to the emotional state of multiple persons. A person's emotional state is correlated to the person's facial expression. As noted above, there are six universal expressions, happy, sad, surprise, disgust, fear and anger. In addition to these expressions is the neutral expression or 'no-expression,' which could be defined as the expression on a face when none, or few, of the facial muscles are contracted. Computer systems that detect what expression is on the digital image of a face depend on, a manually selected, availability of an image of the face with a neutral expression (without expression). Face recognition systems work best when both the enrolled face and the face to be authenticated have no expression. The ability to detect if a face image has no expression has, in general, many applications since it eliminates one complicated degree of freedom, the facial expression, from the face image acquisition process.

The current invention is concerned with the automatic detection of the neutral expression in images of faces in digital images. This invention is better understood by the included drawings. Referring now to these drawings, FIG. 1 shows a picture of a computer user where the computer has an attached camera that views the user's face. That is, the user's 100 face 105 is in the field of view of camera 110. The user interacts with the computer using his hands 115 and keyboard 120 and possibly a computer mouse (not shown). That is, the user input devices are limited to keyboard and mouse manipulated by the user's hands. The computer interacts with the user 100 through a user interface displayed on computer monitor 150, the output device. Another input device is the camera 110 that views the input scene, illuminated by light source 160, containing the user's face. Through this input video stream, a continuous stream of digital images containing the user's face is available to the computer. This video stream can be used for screen savers based on face presence detection, user authentication based on face recognition and computer reaction to the user based on the expression on the user's face.

Figure 2:
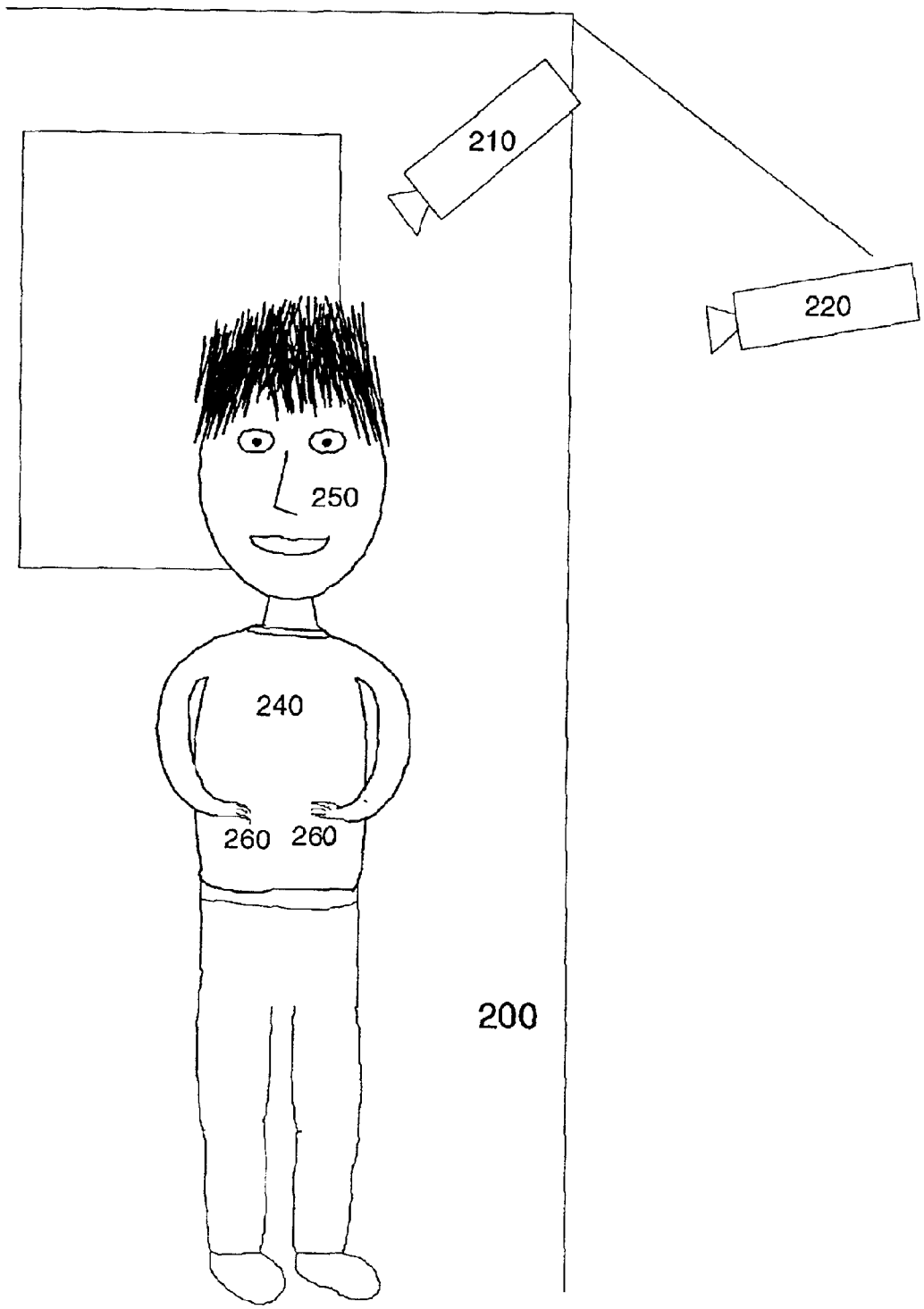
FIG. 2 shows a more general setup where a person and the person's face are monitored by camera(s) in the environment.

Turning our attention to FIG. 2 here is shown an environment 200 where there are multiple input digital cameras 210 and 220. These cameras could have zoom, pant, tilt capabilities, and, consequently, have the ability to view any objects (like the person's 240 face 250) in the environment at any scale. Hence, the person 240 has the potential capability to interact with the environment and associated computer systems through the user's face 250, hands 260 and other body parts. The person 240 in this environment 200 has no means like keyboard or computer mouse to interact with the environment, which is the case in traditional human computer interaction. One way for the person 240 to, actively or passively, communicate with the environment and associated computing systems is through facial expressions, the subject of this invention.

Figure 3A:
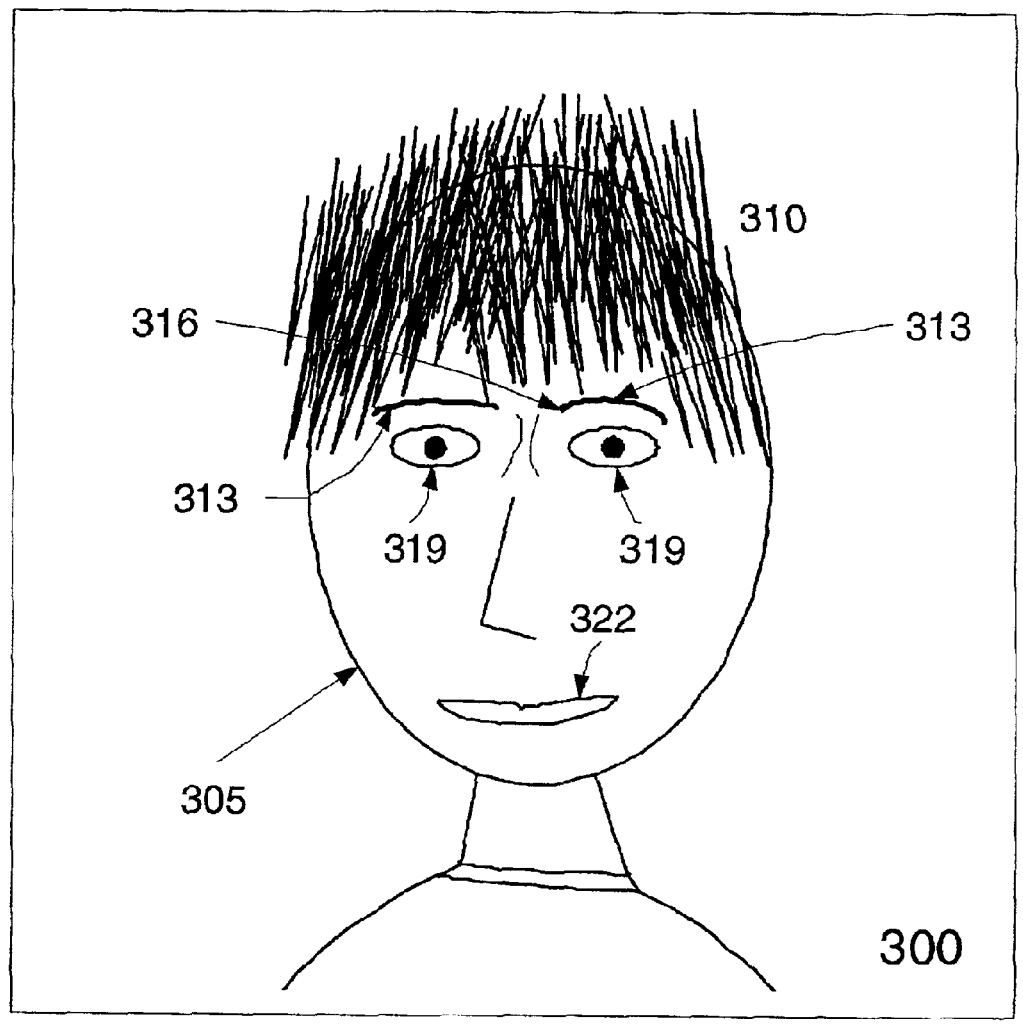
FIG. 3A is a drawing of a person's face without expression, i.e., a neutral face (prior art).

FIG. 3A shows the drawing of an image 300 of a human face with a neutral expression 305 or no expression. (The notion of a neutral face is prior art.) The hair 310 may or may not cover much of the ears (not shown) and eyebrows 313. Hence, for automated machine classification of human expressions these features are of little value. In a preferred embodiment, the eyebrow features that are of use are the inner corners 316. Further face features that are of use for automated neutral face detection are the shape and distance of the eyes 319 and the mouth 322.

Figure 3B:
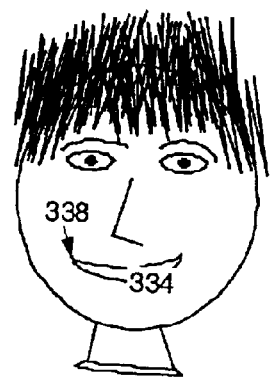
FIG. 3B shows drawings of the six, prior art, universal face expressions: happy, sad, surprise, disgust, fear and anger (prior art).
Figure 3B:
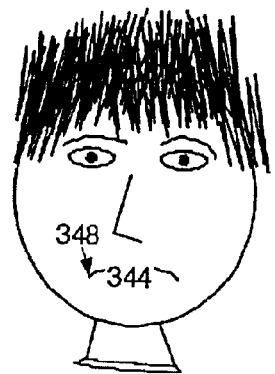
Figure 3B:
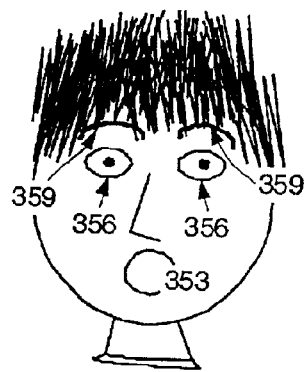
Figure 3B:
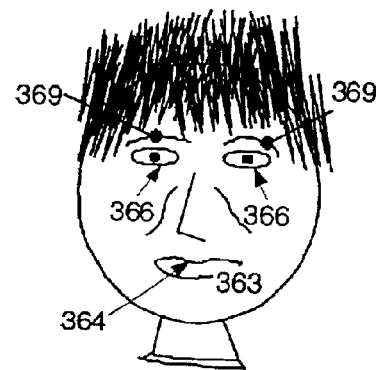
Figure 3B:
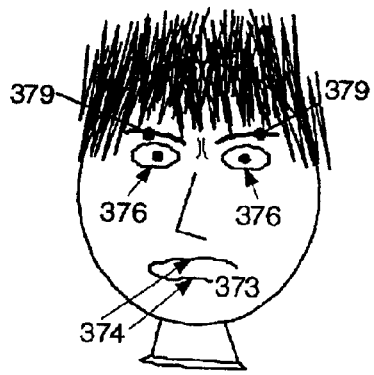
Figure 3B:
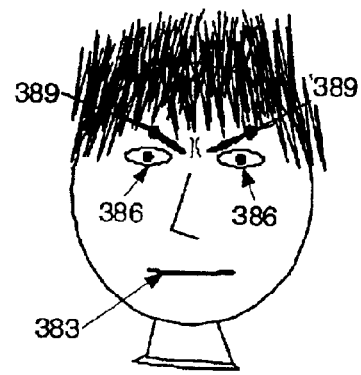

Moving on to FIG. 3B here are shown drawings of the six prior art universal expressions. These expressions are: the happy expression 330, the sad expression 340, the surprise expression 350, the disgust expression 360, the fear expression 370, and the anger expression 380. As noted above, these expressions are universal over the cultures and races, in that, these expressions are universally understood between people without the need for communication through some common language. Each expression is characterized by, among other face features, the shape and location of the eyebrows 313, the shape of the eyes 319 and the shape of the mouth 322 (FIG. 3A). A happy face 330 is mainly characterized by the circular shape 334 of the mouth, i.e., the mouth is of the shape of a circular arc with the mouth corners 338 curved up. A sad, or unhappy, face 340, on the other hand, is also characterized by the circular shape 344 of the mouth, however, now the mouth is of the shape of a circular arc with the mouth corners 348 curved down. The surprise expression 350 is characterized by more changes in the face appearance from the neutral face 305. The mouth 353 is generally in an open position and of circular or oval shape. The eyes 356 are opened wider than in the neutral face and, consequently, the eyebrows are raised 359 and somewhat broadened. The disgust expression 360 differs in different ways from the neutral face 305. The mouth may be somewhat opened or closed and of oval shape 363 while there may be some convexity on the upper lip 364. The upper lip 364 moves up. The eyes 366 may be somewhat closed, i.e., of a more oval shape than in the neutral face 305. The eyebrows 369 may therefore be somewhat lowered. For the fear expression 370, again there are deformations from the neutral face 305. The mouth in this case is of a bent oval shape 373, where the curvature 374 is downward. That is, the mouth corners are slightly down with respect to a neutral mouth shape. The shape of the eyes 376 is somewhat widened indicating that the subject is fearful of something. The eyebrows 379 for the fear expression are straighter than is the case for the neutral face and may be pointing upward a little. Finally we have the expression of anger 380. This expression is again a deformation of the neutral face, with the shape of the mouth 383 straight and narrow. The eyes 386 somewhat more closed than in the neutral expression. Just like the mouth 383, the eyebrows 389 are also straightened out. The inner sides of the eyebrows is lowered while the outsides are higher than in the neutral case.

Figure 4:
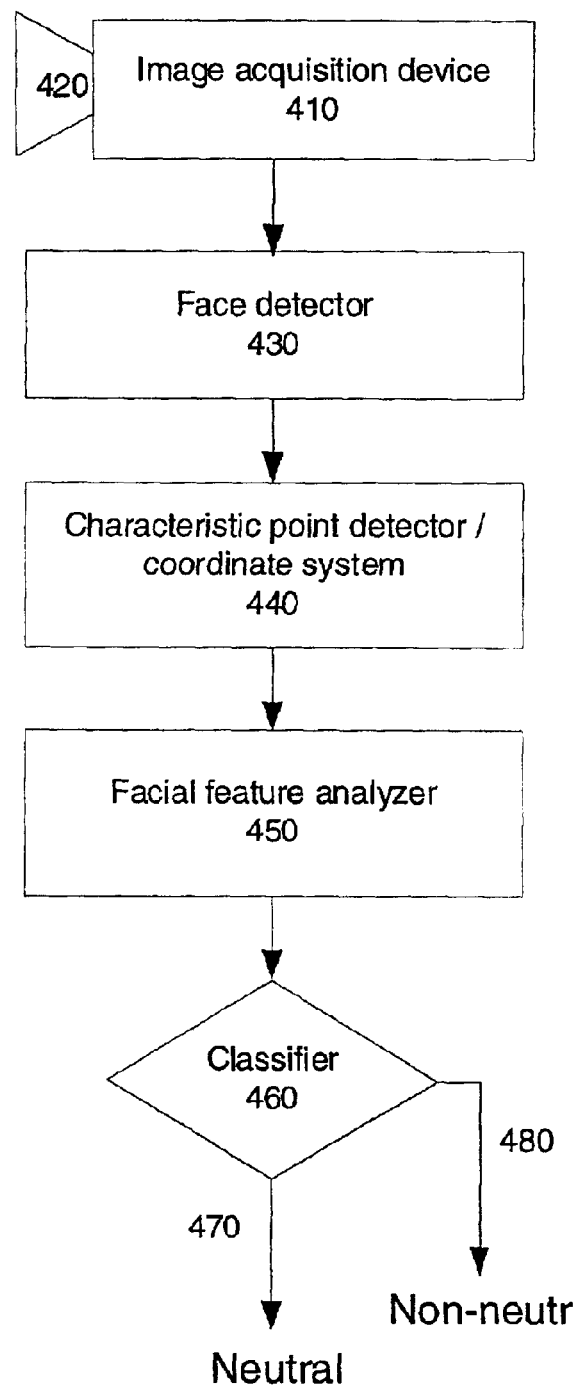
FIG. 4 is a block diagram of the neutral face detector system.

FIG. 4 is a block diagram of the novel neutral face detection system. It shows the image/video acquisition device (camera) 410 with lens 420 (possibly a zoom, pan and tilt lens) which is used for imaging the objects such as human bodies or body parts 100, 105, 115, 240, 250 and 260. The image/video, acquired by acquisition device 410 is digitized into a fixed number of pixels, each quantized into a fixed number color intensity values by a frame grabber. This is the case if image acquisition device 410 is analog. If the camera is digital, the image/video is directly input into face detector system 430 through USB or firewire. This face detector system 430 determines if there are one or more faces in the image. If there are faces in the image, the characteristic point detector 440 localizes a number of prior art characteristic points. System 440 further establishes a local coordinate system for each face image detected by face detector 430. The image area around each set of characteristic points, for each face characterized by a local coordinate system is then analyzed by facial feature analyzer 450. This system 450 computes one or more facial features and based on the features, classifier 460 determines if the corresponding face depicts a neutral face 470 or a non-neutral face 480.

Figure 5A:
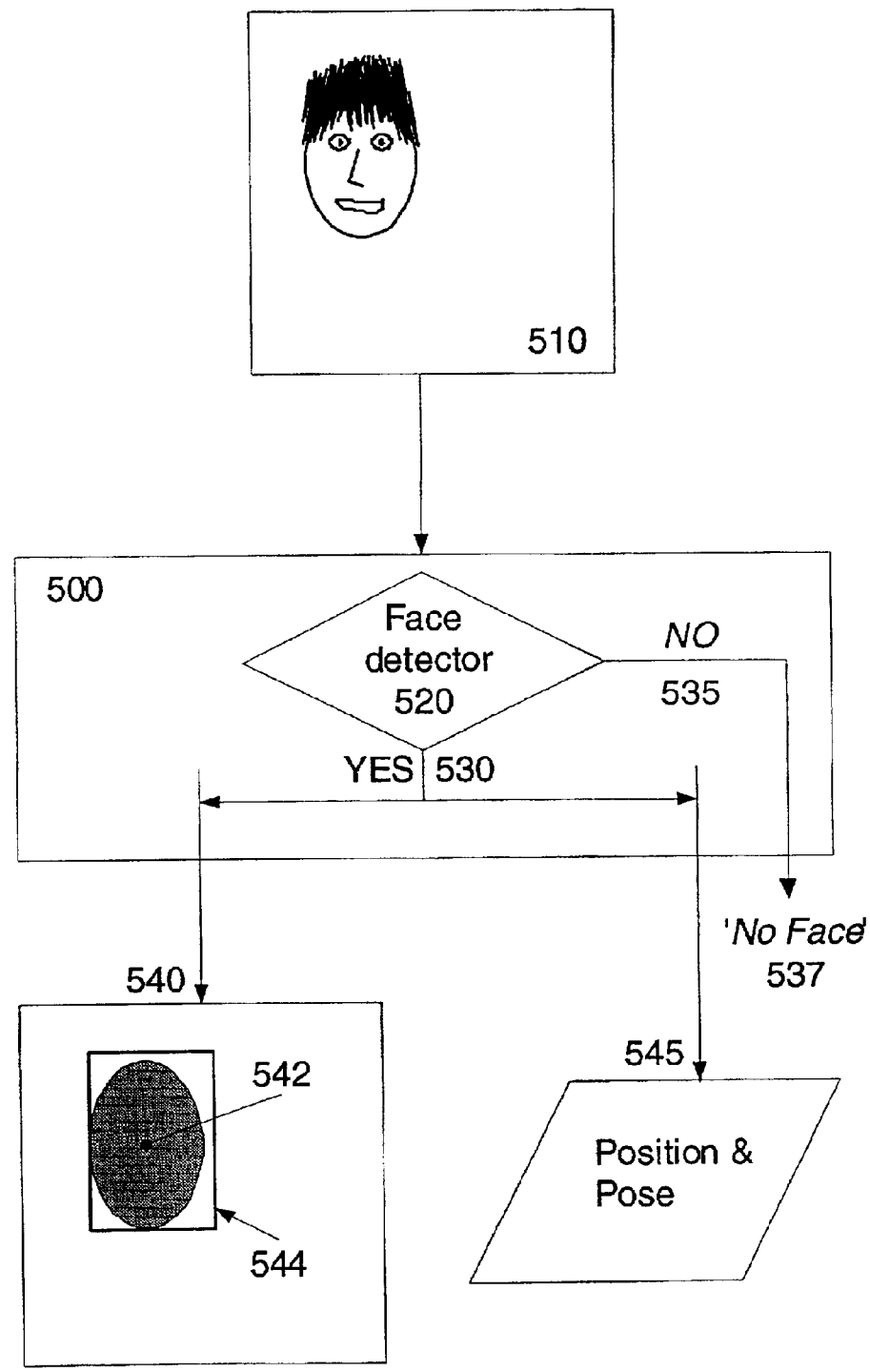
FIG. 5A is a block diagram of a prior art face detector in digital images or video, which has as output the face image and the face position & pose parameters.
Figure 5B:
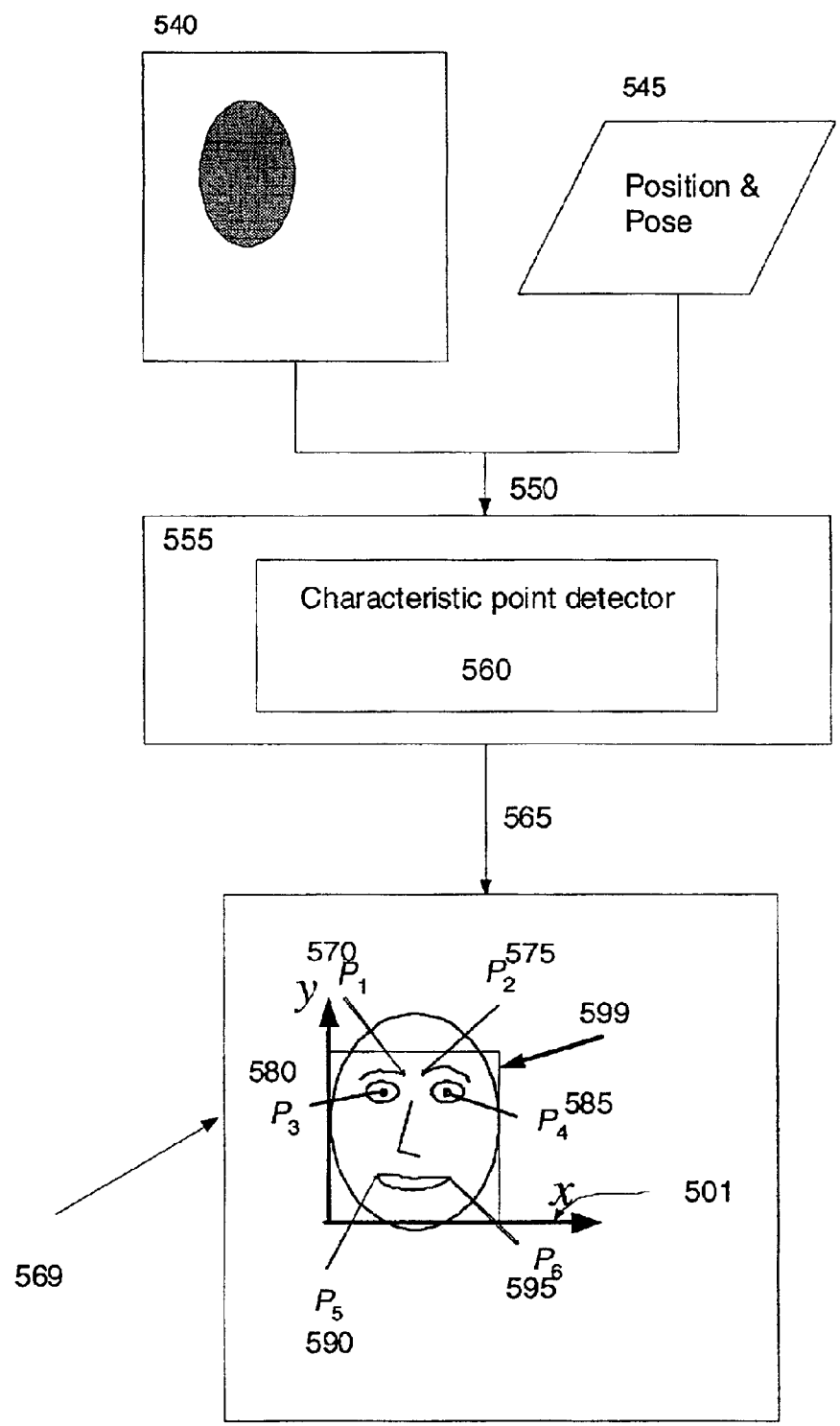
FIG. 5B is a block diagram of a prior art face characteristic point detector, which has as output the location of six points on the face image of FIG. 5A.

FIGS. 5A and 5B refer to prior art image/video processing systems for detecting faces and specific characteristic points in the faces that are found in the images. These systems are used in the neutral face classification system subject of this invention.

FIG. 5A is face detector that can be found in the prior art. Like the neutral face classifier of FIG. 4, this system takes images or video containing faces 510 as input to a computer system 500. A face detector module 520 detects the presence of a face. If a face is detected 530 the system 500 outputs parameters derived from the face image. If no face match is detected 535, the output the computer system 500 with face detection module is 'No Face' 537. If a face match is detected 530, the computer system 500 determines face parameters. These parameters are output as 540 and 545. Output 540 is the face image appearance 542 in a bounding box 544 for a still image. In case of input video, it is a face appearance image 542 with bounding box 544 for each input frame. The face position and pose output 545 are the location in the image of the face with respect to an image coordinate system and an estimated rotation of the face within the image and possibly rotation of the 3D head with respect to the image axes. Alternatively, the parameters could be defined within some world coordinate system that is related to the image coordinate system through a projection.

Continuing with FIG. 5B where is shown a prior art face characteristic point (landmark) detector. This is a computer system 555 that takes as input 550, which is the output (540 and 545) of the face detector system described in FIG. 5A. When there is a face present in image/video 510, which is indicated to system 555 by a non NIL value of input 550, a prior art characteristic point detector 560 computes the locations of salient landmarks (points). These points are output 565 as a list of image locations and are expressed in terms of image/frame 569 coordinates. The characteristic points include as a first set the inner point of the right eyebrow $P_1$ 570 and the inner point of the left eyebrow $P_2$ 575. As a second set of characteristic points, we have the center of the pupil of the right eye $P_3$ 580 and the center of the pupil of the left eye $P_4$ 585. A final set is the right corner of the mouth $P_5$ 590 and the left corner of the mouth $P_6$ 595. (Here left and right is defined with respect to the person whose face is imaged.)

Further, a window 599 is selected such that it encloses the face image with certain tolerances. This window 599 is associated with a face coordinate system x, y 501.

Figure 6:
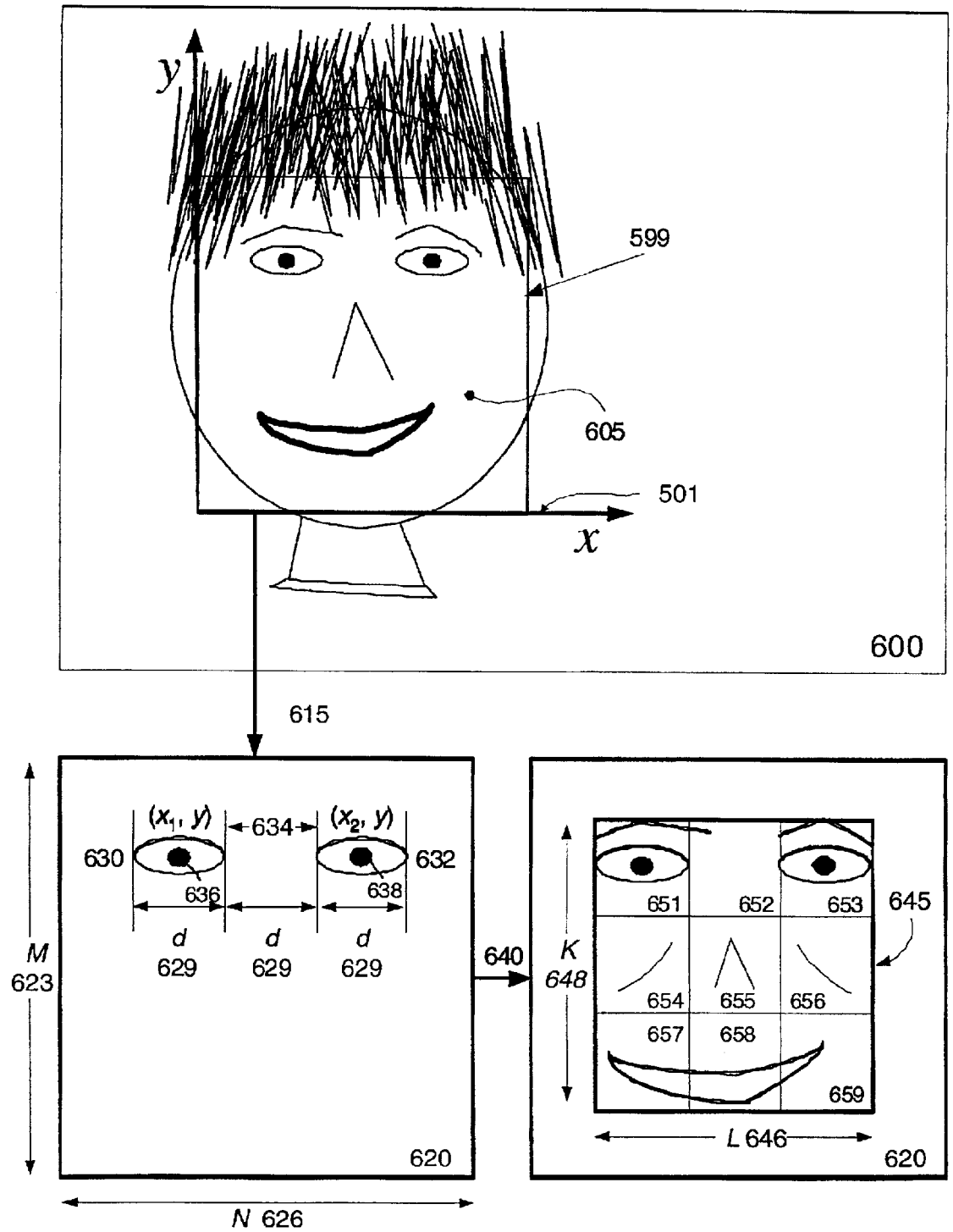
FIG. 6 explains how the outputs of the face detector and the characteristic point detector are used to normalize the face image to a fixed resolution and how nine zones in the normalized face image are determined.

FIG. 6 explains how the outputs of the face detector and the characteristic point detector are used to normalize the face image to a fixed resolution and how the zones in the normalized face image are determined. Image 600 is the input image or a frame of the input video (i.e., an image 510). The input image 600 contains the appearance of a human face (face image) 605. Furthermore, it contains a smaller image or window 599 that encloses within specified tolerances the visual appearance of the human face. The window is associated with coordinate system 501. This window is selected in such a way that the important features for face expression are containing therein. We refer in the rest of this invention description to this window as the face image or face appearance image. (This face image can be at the original resolution of input image 600 or it can be at the resolution of image 620 after re-sampling, or normalization, of transform 615.)

This face image 599 is normalized 615 to a fixed size M 623 by N 626 face image 620 by re-sampling. That is, the image 599 is sampled at new pixel positions by either interpolating between pixels or weighted averaging of multiple pixels. The face image 620 size is selected in such a fashion that the distance from the left corner 630 of the left eye to the right corner 632 of the right eye is approximately three times the distance d 629. This distance d 629 is also half of the width of the centers of the eyes which, in most faces, is also the distance 634 between the inner corner of the eyes. The image width N 626 is further selected such that N=4×d. In a preferred embodiment of this invention M=N=128 and d=32 pixels. The distance between the centers of the eyes 636 ($x_1$,y) and 638 ($x_2$, y) is then approximately also equal to 2×d, i.e., $x_2-x_1$=2×d which is 64 pixels.

The next step is to place 640 a sub-image 645 of size K×L in the face image 620. Here L 646 is selected such that L=3×d and K can be chosen to be approximately equal to L 646. In the preferred embodiment of this invention K=M=128 and L=3×d=96. The sub-image 645 contains zones (windows) 651, 652, 653, 654, 655, 656, 657, 658, and 659 of size K/3×L/3. The sub-image 645 is then so placed that the eye features falls in zone 651 and 653, respectively. The mouth features then fall in zones 657, 658 and 659.

The process described in the following figures uses the zones and the characteristic face points for further feature estimation. That is, FIGS. 7A, 7B and 7C are concerned with determining the facial features that are used to classify if a facial expression is neutral or not.

Figure 7A:
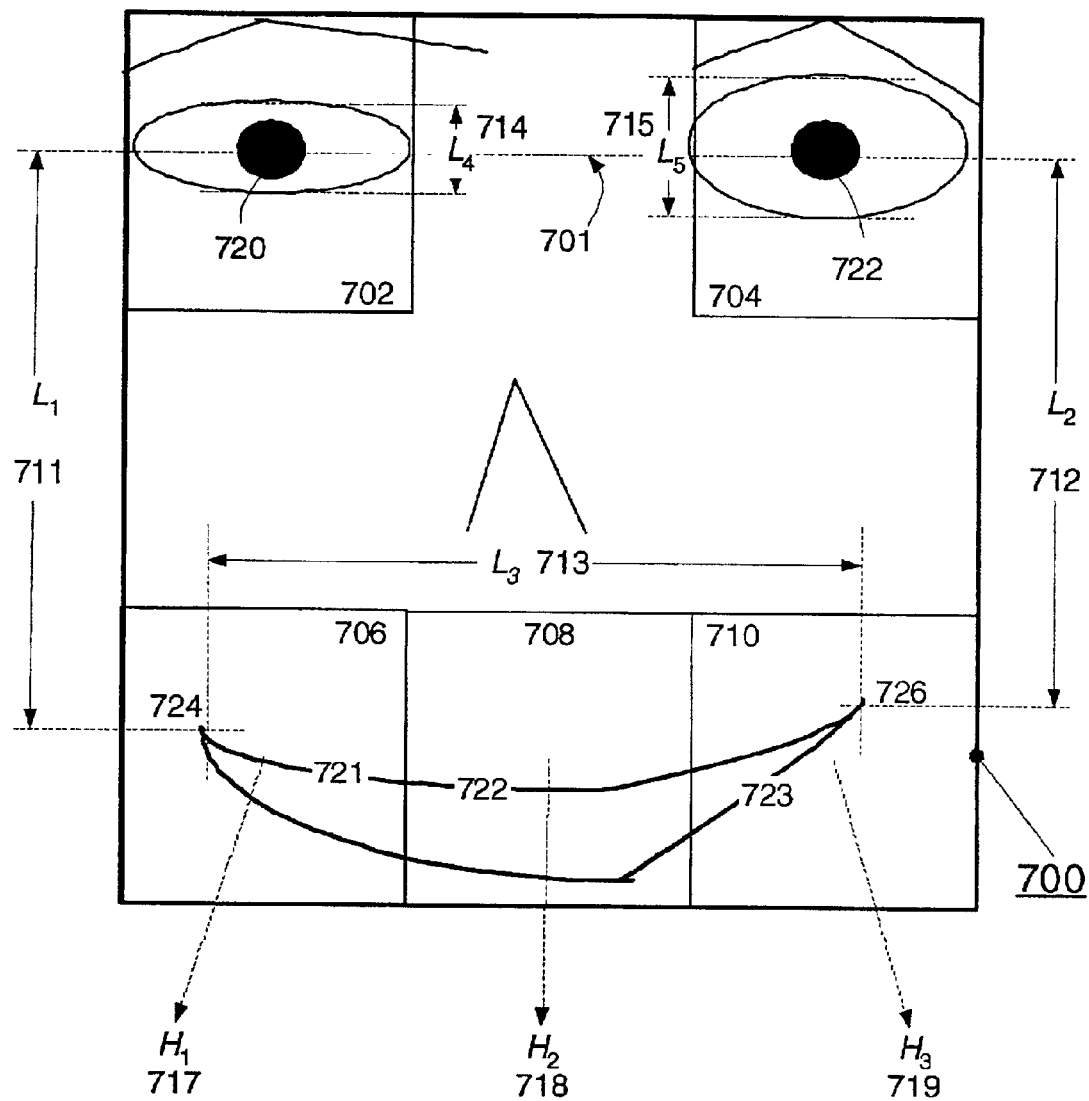
FIG. 7A shows a preferred way to determine image zones to measure five distances between face characteristic points and it shows a preferred way to determine image zones that are used to compute edge direction histograms.

FIG. 7A shows the facial features of the facial sub-image 700 that are used for neutral facial expression detection. The feature are extracted, in particular, from zones 702, 704, 706, 708, and 710. First five distance measures $L_1$ (711), $L_2$ (712), $L_3$ (713), $L_4$ (714) and $L_5$ (715) are estimated. (In the following 'left' and 'right' refer to the left and right side of the face sub-image.) These distances are: 1) the vertical distance 711 from the left eye pupil 720 to the left corner 724 of the mouth; 2) the vertical distance 712 from the right eye pupil 722 to the right corner 726 of the mouth. [These two distances are computed by determining the line 701 connecting the centers of the eyes 720 and 722.] 3) the distance 713 from the left corner of the mouth 724 to the right corner of the mouth 726; 4) the height "openness" 714 of the left eye, and 5) the height "openness" 715 of the right eye. Further, three shape histograms of the mouth edges are computed. These are one shape histogram $H_1$ 717 from the mouth edges 721 in zone 706, one shape histogram $H_2$ 718 from the mouth edges 722 in zone 708, and one shape histogram $H_3$ 719 from the mouth edges 723 in zone 710. The features that are output of the step described in this figure are input to the classifier. These features are $f_1=(L_1+L_2)/2$; $f_2=L_3$, $f_3=L_4$ and $f_4=L_5$ and the histograms $H_1$, $H_2$ and H3. FIG. 7C explains the process of deriving these shape histograms.

Figure 7B:
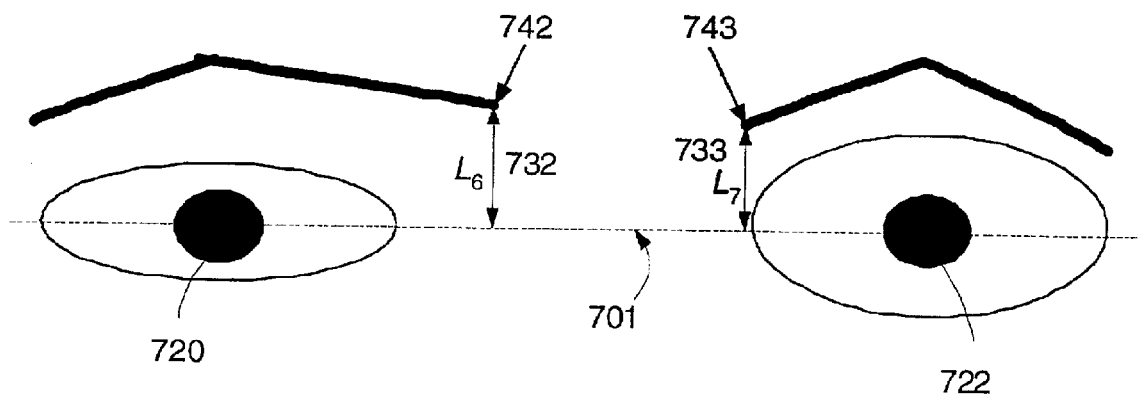
FIG. 7B shows how two additional distances between the inner eyebrows and the line connecting the centers of the eyes are determined.

FIG. 7B gives a detail of FIG. 7A and shows how two additional features are computed from the face image. The figure shows the center 720 of the left eye, the center 722 of the right eye and the line 701 connecting these centers. Using this line, the distance from the left inner eyebrow point 742 to the line $L_6$ 732 is determined. Further, using this line, the distance from the right inner eyebrow point 743 to the line $L_7$ 733 is determined. This gives two additional facial features $f_5=L_6$ and $f_5=L_7$.

Figure 7C:
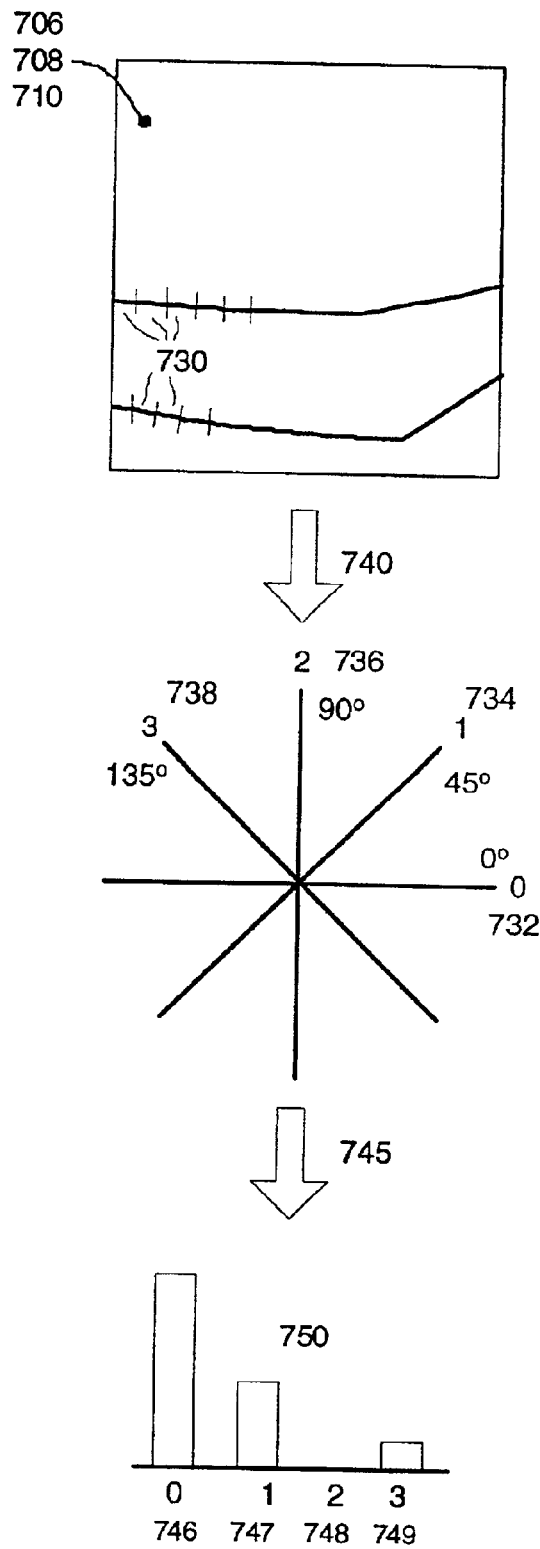
FIG. 7C shows a pictorial explanation and a flow chart of the image zone edge histogram computation.
Figure 7C:
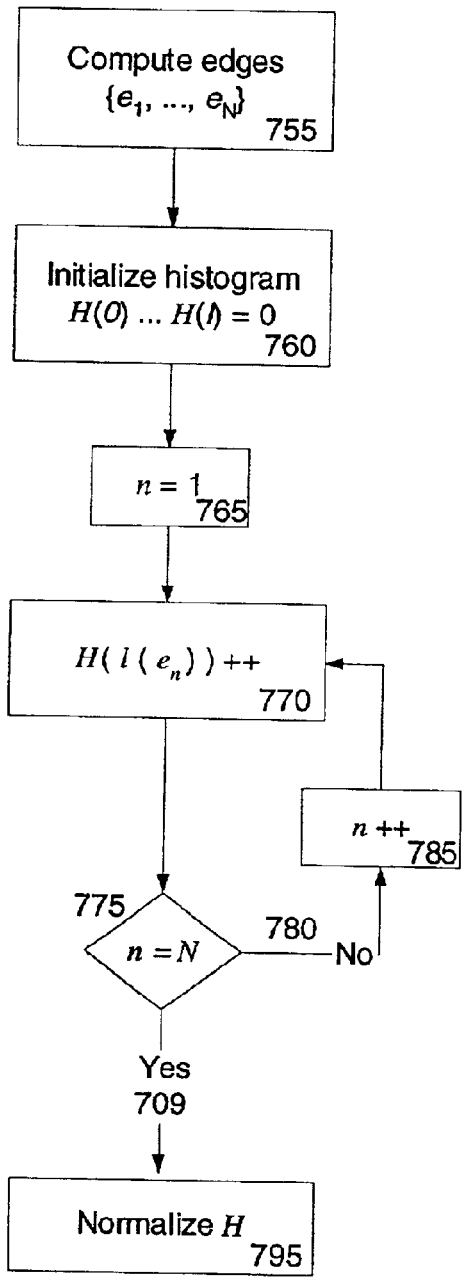

Moving on to FIG. 7C. On the left a pictorial description of the shape histogram computation process is shown; on the right a flow diagram of the shape histogram computation process is shown. Input to the shape histogram computation process are the edge elements 730 in zone 706, zone 708 or zone 710. These zones are used for the computation of histogram 717, histogram 718, and histogram 719, respectively. The edge elements 730 in a zone each have a location (x, y) and a direction d. The direction is quantized into 0 degrees 732, 45 degrees 734, 90 degrees 736 and 135 degrees 738 in step 740. Next, the label '0' is assigned to 0 degrees 732, label '1' is assigned to 45 degrees 734, label '3' is assigned to 90 degrees 736, and label '3' is assigned to 135 degrees 738 and these labels are assigned to the edges.

Subsequently, is step 745 for each label, the number of edges that have this label are counted. These counts are accumulated in buckets 746, 747, 748, 749 of shape histogram 750. That is, bucket 0 (746) will have the number of edges with quantized direction equal to zero, bucket 1 (747) will have the number of edges with quantized direction equal to one, end so on. As a final step histogram 750 is normalized by the number of edges N in the corresponding zone.

The flowchart on the right in FIG. 7C describes the computational process of determining histograms 717, 718 and 719. In step 755 the edges in zone 706, 708 or 710 are detected, these edges are denoted as $\{e_1, \ldots, e_N\}$ with a total of N edges. Initialization is performed in steps 760 and 765. Step 760 sets the histogram values H(0)=H(1)=H(2)=H(3)=0 (here I in 760 is 3 because the highest label is 3) and step 765 sets n=1. Subsequently the process enters a loop with variable n. In 770 the histogram bucket H ($l(e_n)$) is incremented by one, where $l(e_n)$ is the label of edge direction d ($e_n$) of edge $e_n$. The test 775 then determines if n=N. If not 780, the loop variable n is incremented by one in step 785 and step 770 is repeated. If, on the other hand n=N in test 775 ('Yes' 709), the process branches to step 795. This step normalizes the histogram by dividing the number in each bucket 746, 747, 748, 749 by N.

The outputs of the processes of FIG. 7 are the five distance features $f_1=(L_1+L_2)/2$; $f_2=L_3$, $f_3=L_4$ and $f_4=L_5$ and the histograms $H_1$, $H_2$ and $H_3$. Each histogram itself is four features, that is, $H_1(0)=f_5$, $H_1(1)=f_6$, $H_1(2)=f_6$ and $H_1(3)=f_7$; $H_2(0)=f_9$, $H_2(1)=f_{10}$, $H_2(2)=f_{11}$ and $H_2(3)=f_{12}$; and $H_3(0)=f_{13}$, $H_1(1)=f_{14}$, $H_1(2)=f_{15}$ and $H_1(3)=f_{16}$. These 16 features are the K=16 features that are the input to the classifier of FIG. 10.

Figure 8:
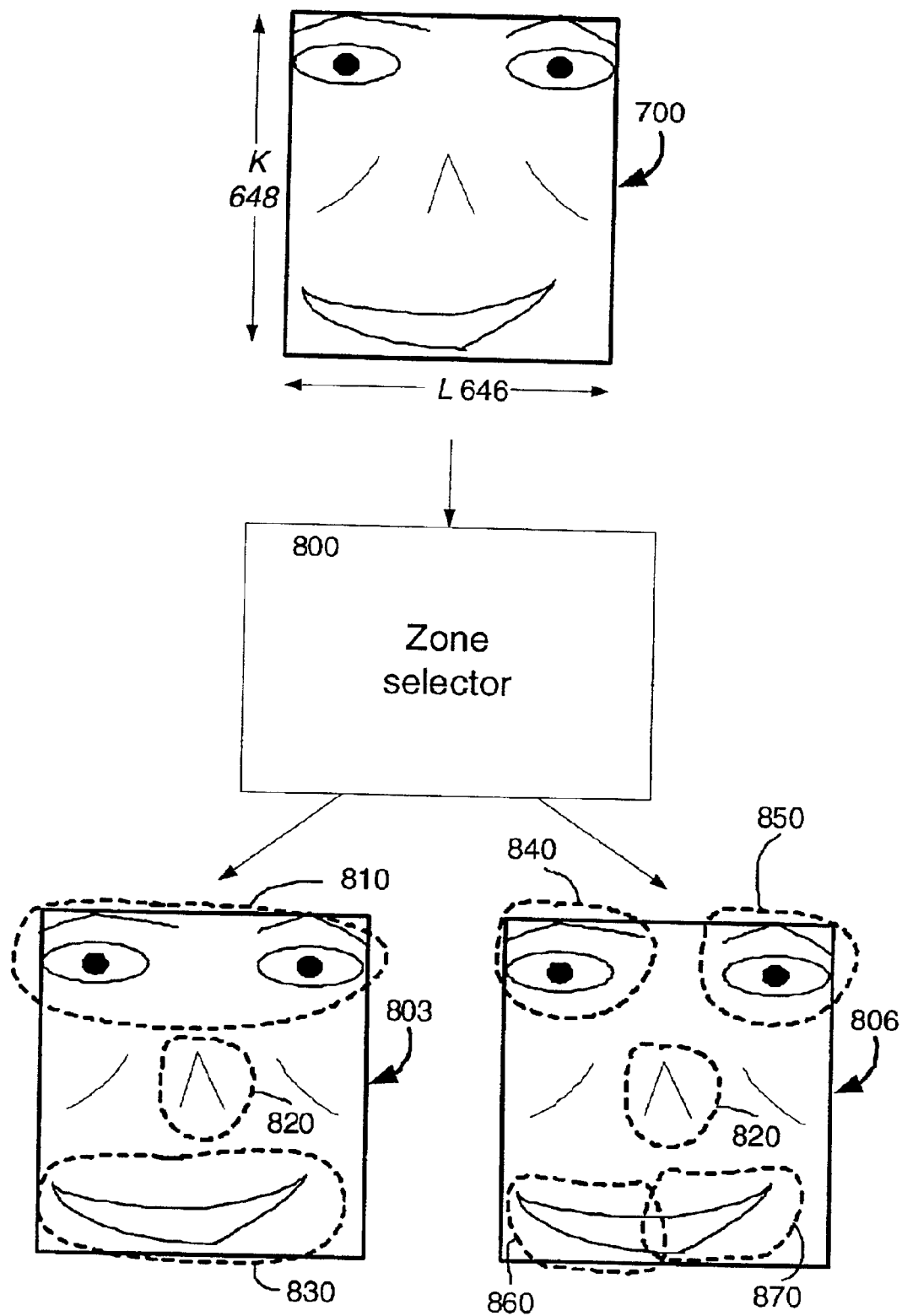
FIG. 8 show a system diagram of general methods to determine the image zones.

Whereas FIG. 7A shows a preferred method for determining image zones from the facial sub-image 700, FIG. 8 gives a system diagram for determining image zones in general. This zone selector 800 takes as input a sub-image 700 of size K (648)×L (646) in the face image 620. Zone selector 800 determines zones within the face sub-image 700. On the left 803 in FIG. 8, three zones are established in face sub-image 700. These zones are 810, 820 and 830. The zones contain the eyes, the nose and the mouth respectively. On the right 806, five zones 840, 850, 820, 860 and 870 are established. Zones 840 and 850 contain the left and right eye, respectively. As in 803, zone 820 contains the nose. Zones 860 and 870 contain the left and the right side of the mouth, respectively. The zone selector determines the zones based on an implicit model of a face. The zones can be simple rectangular image regions where the regions may or may not be overlapping. The zones can further be based on the presence of facial features such as edges. For example, around the center of an eye an region can be constructed such that as much edge detail is contained as possible within the region. Other methods for selecting regions or zones are obvious to those skilled in the art.

Figure 9:
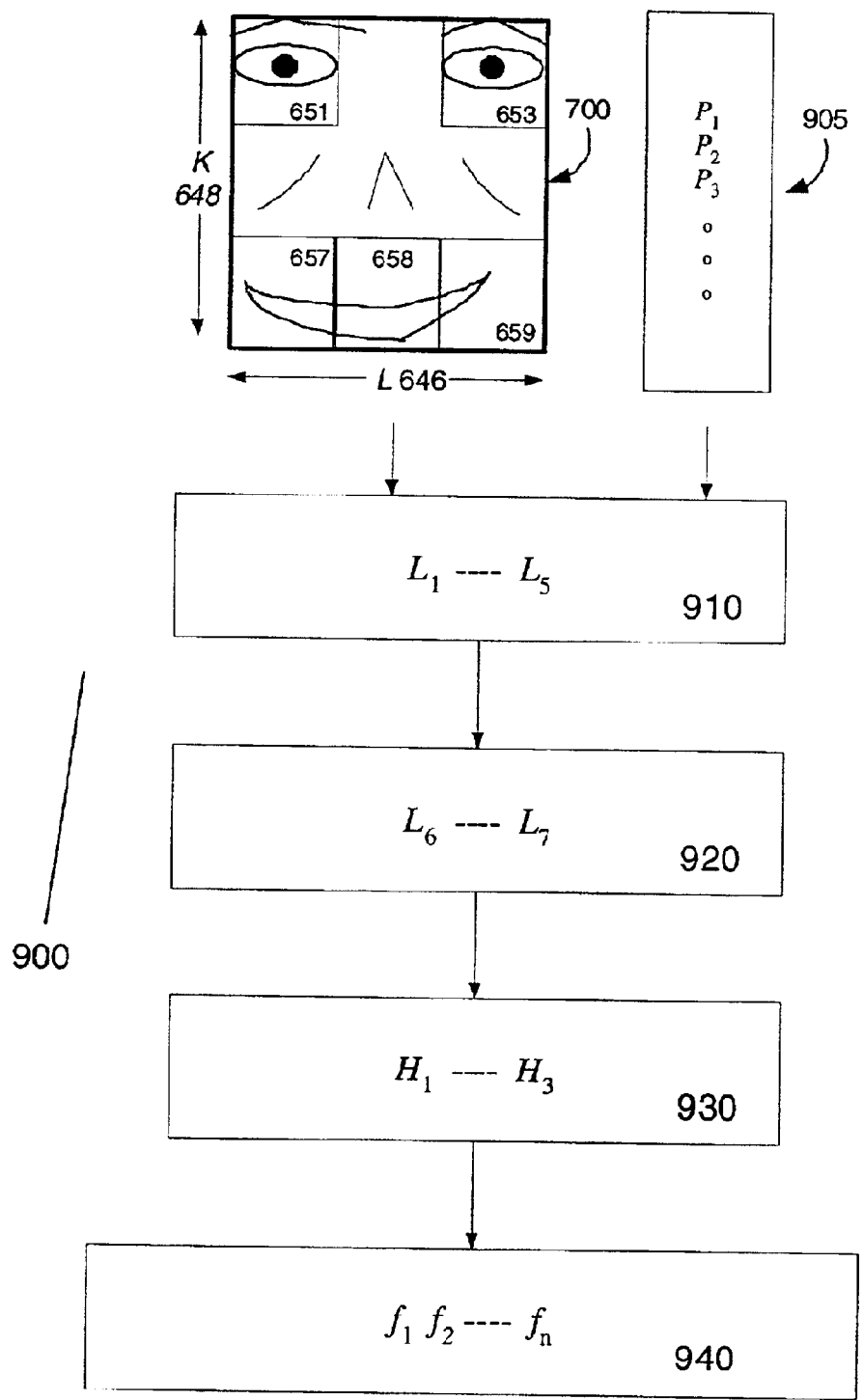
FIG. 9 shows a preferred method for computing facial features.

FIG. 9 describes in more detail the process by which the facial features are computed. The facial features that are computed by this process are the preferred features of this invention. Input to the system are face sub-image 700 with zones 651, 653, 657, 658 and 659. This sub-image is of size K 648 rows and L 646 columns. Also input to the system are the characteristic points $P_1$, $P_2$, $P_3$, $P_4$, $P_5$ and $P_6$ 905. The characteristic points include as a first set the inner point of the right eyebrow $P_1$ 570 and the inner point of the left eyebrow $P_2$ 575. As a second set of the characteristic points, we have the center of the pupil of the right eye $P_3$ 580 and the center of the pupil of the left eye $P_4$ 585. A final set is the right corner of the mouth $P_5$ 590 and the left corner of the mouth $P_6$ 595.

Step 910 in process 900 determines distances (lengths) $L_1$ 711, $L_2$ 712, $L_3$ 713, $L_4$ 714 and $L_5$ 715. First the line 701 that connects the center of the pupil of the right eye $P_3$ 580 and the center of the pupil of the left eye $P_4$ 585 is determined. Distance $L_1$ 711 is the distance between line 701 and the left corner of the mouth $P_6$ 595. Distance $L_2$ 712 is the distance between line 701 and the right corner of the mouth $P_5$ 590. Distance $L_3$ 712 is the distance between the inner point of the right eyebrow $P_1$ 570 and the inner point of the left eyebrow $P_2$ 575. Distance $L_4$ 714 is the height of the left eye and is determined by any of ellipse fitting to eye edges, determining the moments of the eye edges, determining the variance of the eye edges in the vertical direction. Similarly, distance $L_5$ 715 is the height of the right eye. Other methods for determining the height of the eyes are within the realm of this invention.

Step 920 in process 900 determines distances (lengths) $L_6$ 732 and $L_7$ 733. Distance $L_6$ is computed as the distance between line 701 and point $P_2$ 570. Equivalently, distance $L_7$ is computed as the distance between line 701 and point $P_1$ 575.

Step 930 of process 900 computes the three edge histograms $H_1$, $H_2$, $H_3$ by processing the edges in zones 657, 658 and 659, respectively. This processing is achieved as explained in FIG. 7C. The mouth shape can be represented using many shape features. Shape histograms of the mouth, or portions of the mouth, is one way of representing shape. Other facial features that represent shape and distance for expression analysis are obvious to those skilled in the art after reading this invention.

Finally, step 940 of process 900 outputs the face features $f_1, f_2, f_3, \ldots$ as they are determined from the distances $L_i$ and histograms $H_j$ or other shape representations/features.

Figure 10:
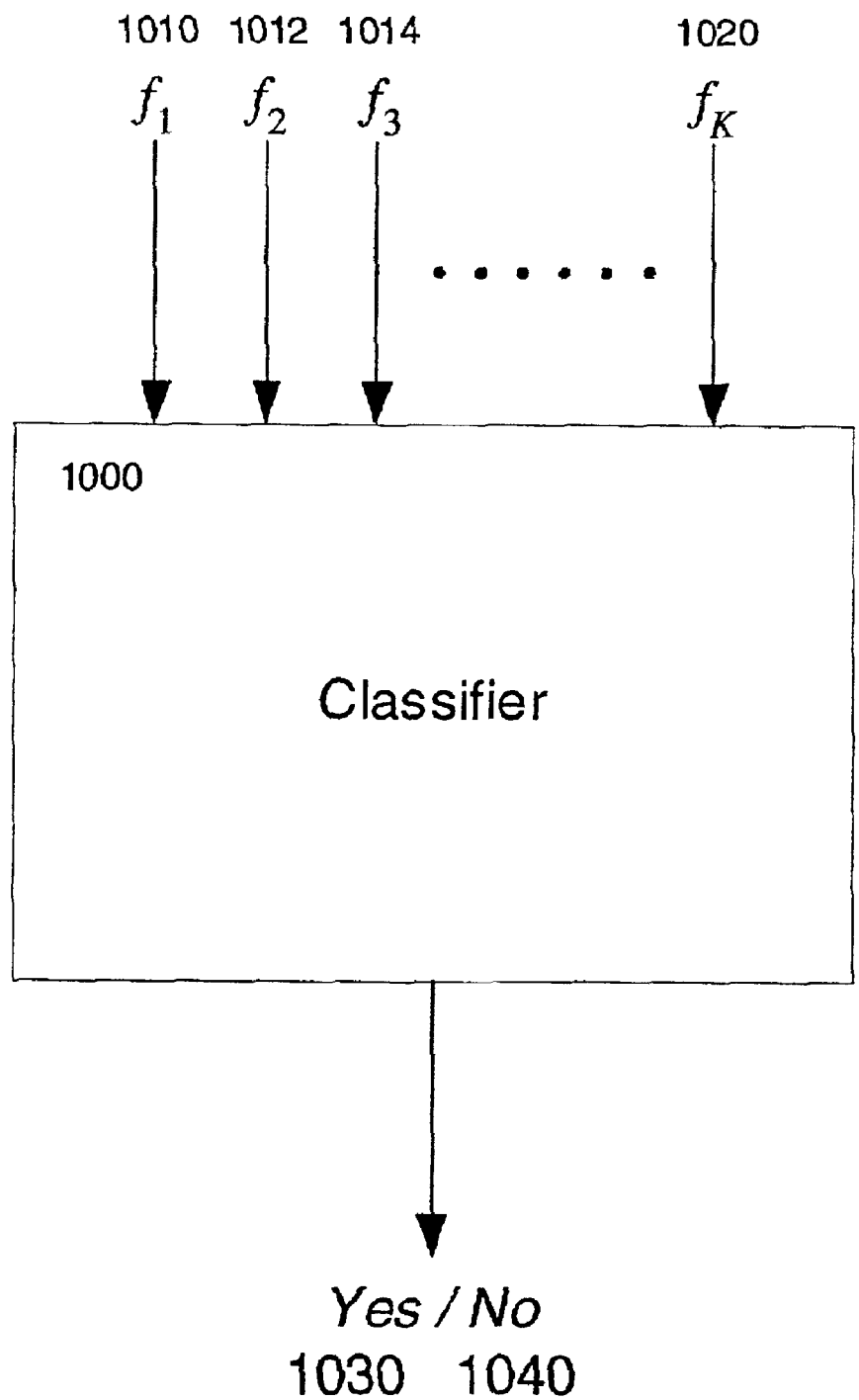
FIG. 10 is a generic classifier that takes as input facial features and determines whether the face is neutral.
Figure 12:
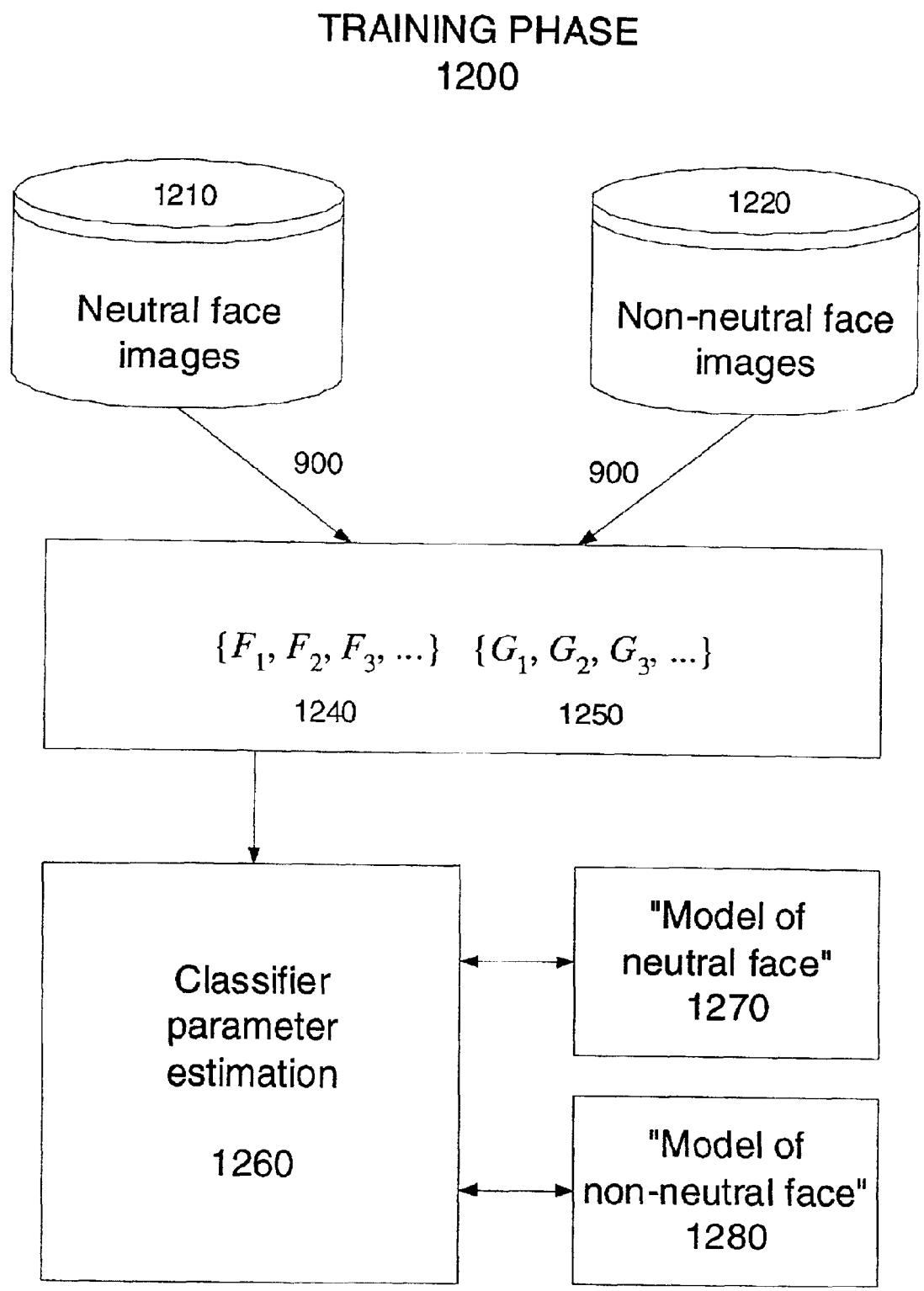
FIG. 12 shows a system diagram for training the neutral face detector system.
Figure 13:
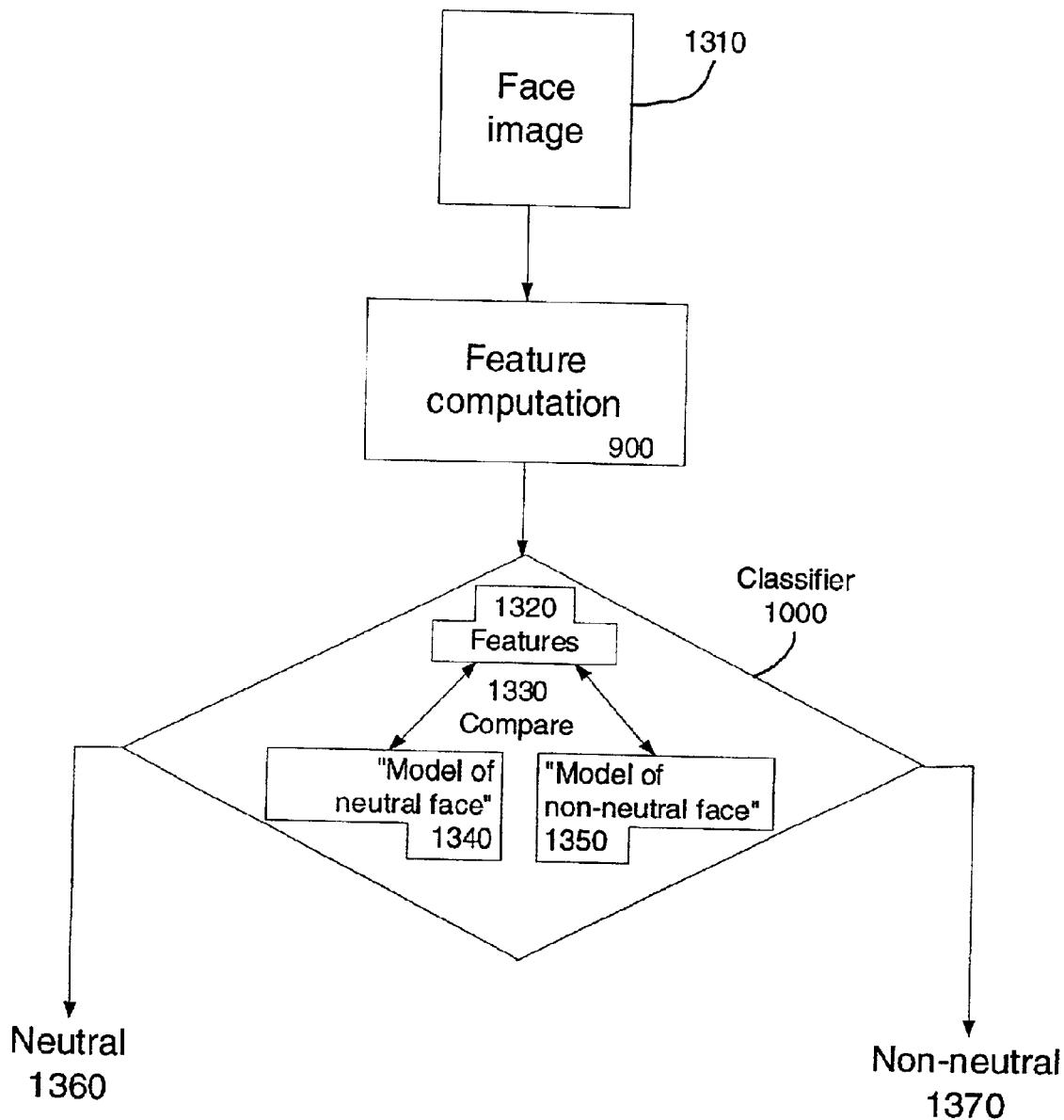
FIG. 13 is a neutral face classifier that compares the features associated with an unknown expression to features associated with neutral and non-neutral expressions.
Figure 14:
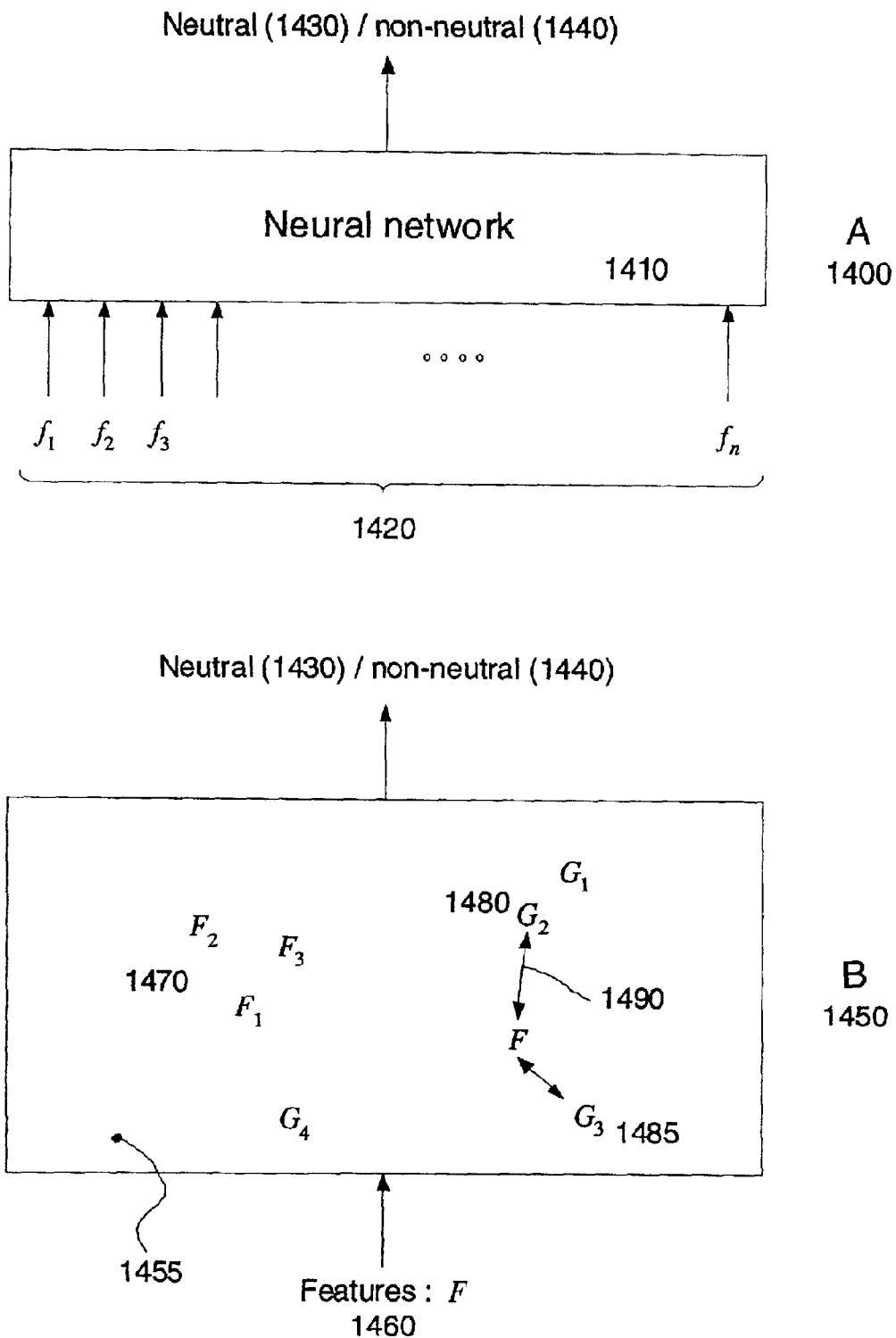
FIG. 14 shows a neutral face classifier that compares the features associated with an unknown expression to features associated with neutral and non-neutral expression through a neural network and through nearest-neighbor classification.

FIG. 10 shows the prior art classifier that decides, based on the features extracted from the zoned face image, if a detected face has a neutral expression or not. The classifier 1000 again is a module a computer system and takes as input the features $f_1, f_2, f_3, \ldots, f_K$ (1010, 1012, 1014, ..., 1020) computed by the systems described in FIGS. 7A and 7B. For the preferred system of FIG. 7, K=19. The classifier 1000 can be any of a number of classifiers found in the prior art. These classifiers are enumerated in the background of this invention. A preferred classifier in this invention is a neural network. This output is 'YES' 1030 when the face expression of the face in the input image/video is neutral and 'NO' 1040 when the face expression is not neutral. FIGS. 12–14 better explain the training and operation of this classifier.

Figure 11:
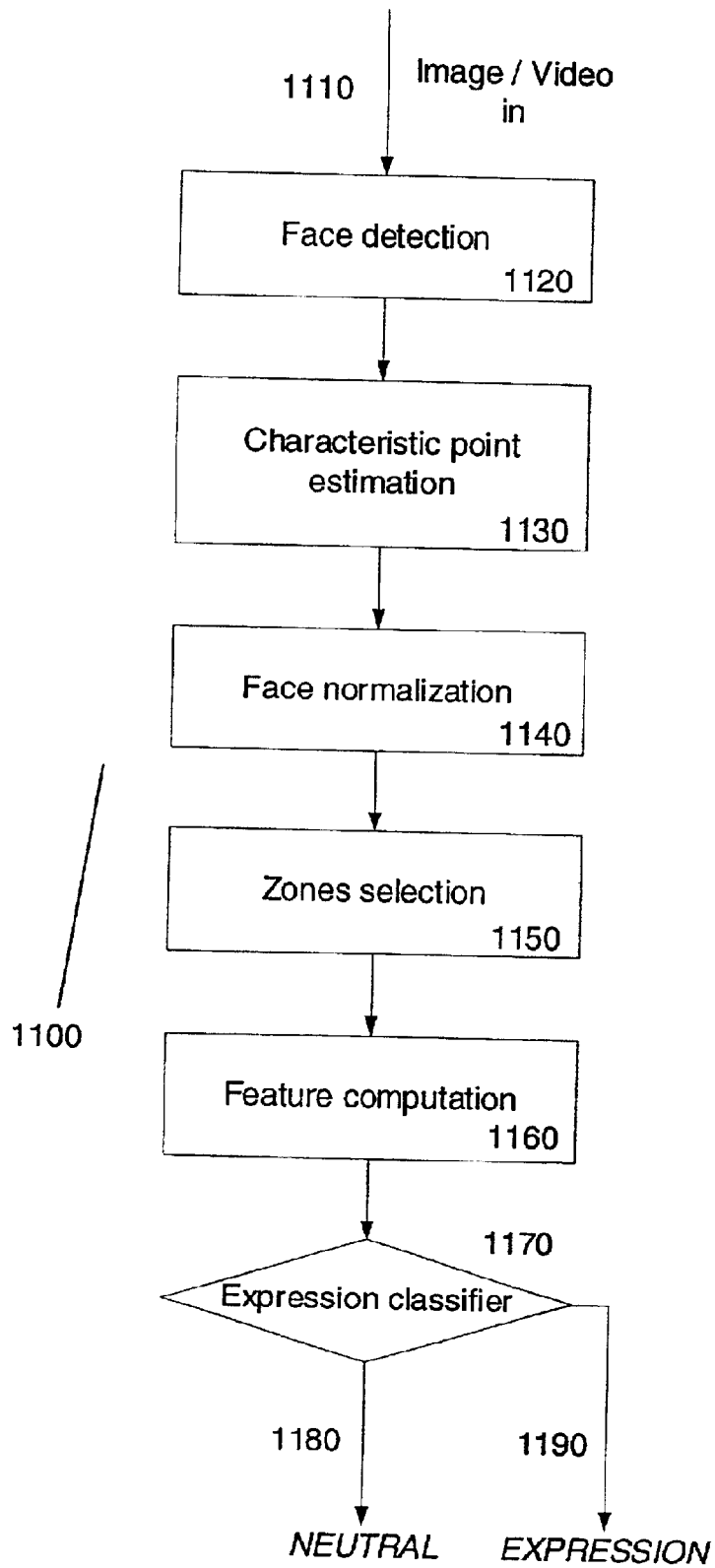
FIG. 11 shows a flow chart of the neutral face detector system.

A flowchart of the complete neutral face detector 1100, subject of this invention, is shown in FIG. 11. The input to the systems is an image or video 1110 that may or may not contain images of human faces. This input signal 1110 is first processed by face detector 1120 to determine if there is an image of a face or images of faces present in the input signal. If this is the case, the face detector 1120 passes the image or images of the face appearance or appearances plus location and pose information on the face(s) to the characteristic point estimation process 1130. This process 1130 uses the output of process 1120, in particular the face appearance image(s), to estimate the location of the characteristic points on the appearance image(s) that are important for facial expression classification. For each face image, these The characteristic points are the corners of the mouth, the center of the eyes (pupils) and the inner endings of the eyebrows. The following process, process 1140, normalizes each face image, which is the output of the face detection process 1120. Here face image normalization is the re-sampling of the face appearance image to an image of fixed, predetermined resolution M×N. These normalized images of face appearances are the input to the zones selection process 1150. This zones selection process is the estimation of the best location for a fixed K×L sub-image within each of the re-sampled normalized face images determined by process 1140. This fixed K×L sub-image contains (3×3) equal-sized windows that contain important facial features for face expression analysis. These windows are passed to feature computation process 1160. The features are shape histograms of the mouth shape and (normalized) distance measures between facial characteristic points (as explained in FIGS. 7A and 7B). The estimated features from the feature computation process 1160 are the input to the expression classifier 1170. (A block diagram of this classifier is shown in the earlier described FIG. 10.) The output of the classifier 1170 is the decision whether a face image is of neutral expression 'NEUTRAL' 1180 or the face image is of some expression other than neutral 1190 'EXPRESSION.' Such non-neutral expressions may be sad, happy, fear, etc.

FIG. 12 shows a system diagram for the training phase 1200 of the neutral face detector system. For this training, a collection 1210 of hand-labeled images of neutral faces and a collection 1220 of hand-labeled images of non-neutral faces is required. Using process 900, two sets of feature sets, set 1240 and set 1250 are computed. The set $\{F_1, F_2, F_3, \ldots\}$ 1240 are the feature sets (or feature vectors $F_i$) associated with the neutral face images, the set $\{G_1, G_2, G_3, \ldots\}$ 1250 are the feature sets (or feature vectors $G_j$) associated with the non-neutral face images. These two sets 1240 and 1250 are used by the classifier parameter estimation process 1260 to determine the parameters of a classifier that distinguishes between neutral faces and non-neutral faces. This classifier (the general classifier 1000 in FIG. 10) then implicitly or explicitly contains a model of a neutral face 1270 and a model of a non-neutral face 1280. Depending on the classifier, these models are used differently. The general case of the use of models is explained in FIG. 13 while more specific uses of models in classifiers are explained in FIG. 14.

Turning our attention now to FIG. 13. Herein is shown a neutral face classifier 1300 that compares the features associated with an unknown expression to features or a model associated with the neutral expression and to features or a model associated with the non-neutral expression. This neutral face classifier takes as input a face image 1310. The feature computation process 900 computes the features $f_1, f_2, f_3, \ldots, f_n$, 1320, denoted as vector F. A "Compare" process 1330 then compares this vector F 1320 to a model of a neutral face 1340 and to a model of a non-neutral face 1350. Based on this comparison, classifier 1000 either classifies input face 1310 as having a neutral expression 1360 or classifies input face 1310 as having a non-neutral expression 1370. Comparing is done in the form of distance measures between the input features $f_1, f_2, f_3, \ldots, f_n$ 1320 and the model representations, correlation measures between the input features $f_1, f_2, f_3, \ldots, f_n$ 1320 and the model representations or any nonlinear function of the input features $f_1, f_2, f_3, \ldots, f_n$ 1320 and the model representations. FIG. 14 describes two specific instances of classifiers, neural networks and k nearest-neighbor classifiers.

FIG. 14 shows a neutral face classifier that compares the features associated with an unknown expression to features associated with neutral and non-neutral expression through a neural network 1400 and shows a neutral face classifier that compares the features associated with an unknown expression to features associated with neutral and non-neutral expression through nearest neighbor classification 1450.

System 1400 is a neural network 1410 trained in the classification phase 1200 (FIG. 12) with a set 1210 of neutral face images and a set 1220 of non-neutral face images. Input 1420 to the neural network are the features $f_1, f_2, f_3, \ldots, f_n$ 1320, i.e., feature vector F. Output of the neural network 1410 is the classification 'neutral' 1430 or 'non-neutral' 1440. The output could take on the values '1' for 'neutral,' and '0' for 'non-neutral.'

System 1450, finally, is a nearest neighbor classifier. It is again trained in the classification phase 1200 (FIG. 12) with a set 1210 of neutral face images and a set 1220 of non-neutral face images. Training, in this instance, means that the feature vectors associated with neutral face training images $\{F_1, F_2, F_3, \ldots\}$ lie in cluster 1470 in feature space 1455. The feature vectors associated with the non-neutral face training images 1220, the set $\{G_1, G_2, G_3, G_4, \ldots\}$ also lie in the feature space, but do not form a cluster. Upon classification of an unknown face image, or an unknown feature vector F 1460, the distances 1490 are computed from the vector F to all the prototype labeled vectors $F_1, F_2, F_3, \ldots$ and $G_1, G_2, G_3, G_4, \ldots$ in feature space 1455. In the figure, the unknown vector F has as nearest neighbors $G_2$ 1480 and $G_3$ 1485. Based on the two nearest neighbors, the vector F is then classified as non-neutral. Output of the k nearest neighbor classifier 1450 is the classification 'neutral' 1430 or 'non-neutral' 1440.

Having thus described our invention, what we claim as new and desire to secure by Letters Patent is as follows:

1. A system for automatically detecting neutral, expressionless face images in digital images, the system comprising:
   an image acquisition unit;
   an face detector receiving input from the image acquisition unit, detecting one or more face subimages of one or more faces in the image;
   a characteristic point detector that receives input from the face detector and that estimates one or more characteristic facial features as characteristic points in each detected face subimage, one of the characteristic points being a first and a second mouth corner on a mouth of the face;
   a facial feature detector that detects one or more contours of one or more facial components;
   a facial feature analyzer that determines a mouth shape of the mouth from the contour of the mouth and creates a representation of the mouth shape, the mouth being one of the facial components; and
   a face classification unit that classifies the representation into one of a neutral class and a non-neutral class.

2. A system, as in claim 1, where the mouth shape is determined by a width of the mouth, the first distance from the first mouth corner to a reference in the coordinate systems, and the second distance from the second mouth corner to the reference in the coordinate systems.

3. A system, as in claim 1, where one or more of the characteristic facial features is an eye openness measure of an eye of the facial image and the representation includes the eye openness measure.

4. A system, as in claim 3, where the eye openness measure of the eyes is measured by a normalized height of the eyes.

5. A system, as in claim 1, where one or more characteristic facial features is derived from any one of an eye region and an eyebrow region in the face subimage.

6. A system, as in claim 1, where the contours are extracted by an edge detector.

7. A system, as in claim 1, where the characteristic facial features are estimated by template matching techniques.

8. A system, as in claim 1, where the facial components include any one or more of the following: a mouth, an eye, an eyebrow, a nose, an ear, and a wrinkle.

9. A system, as in claim 1, where a mouth position of the mouth is determined with respect to a geometric reference.

10. A system, as in claim 1, where a mouth position of the mouth is determined with respect to an image coordinate system.

11. A system, as in claim 1, where the characteristic points define one or more characteristic distances to one or more respective geometric references.

12. A system, as in claim 11, where one or more of the characteristic distances is normalized to another of the characteristic distances.

13. A system, as in claim 11, where the facial feature analyzer divides the face sub-image into two or more zones.

14. A system, as in claim 13, where facial feature analyzer determines one or more component shapes from one or more respective component contours in one or more of the zones.

15. A system, as in claim 14, where the component is the mouth and the shape of the mouth is extracted from three of the zones containing the mouth.

16. A system, as in claim 15, where the shape of the mouth is determined by histograming the contours of the mouth in each of the three zones containing the mouth.

17. A system as in claim 16 where the mouth shape is defined by three shape histograms each corresponding to one of the three zones containing the mouth obtained by quantizing the contour of the mouth into four directions.

18. A system, as in claim 15, where a further component is one or more of an eye and an eyebrow that are extracted from three of the zones containing the eyes.

19. A system, as in claim 11, where one or more of the characteristic distances is the normalized width of the mouth, the width of the mouth being the distance between the first and second mouth corners.

20. A system, as in claim 1, where the characteristic points further include a location of each eye on the face, being eye characteristic points and one of the characteristic distances is a distance between the eye characteristic points, being an eye separation distance.

21. A system, as in claim 20, where one or more of the other characteristic distances is normalized by the eye separation distance.

22. A system, as in claim 20, where the eye characteristic points are located on the eye pupil.

23. A system, as in claim 20, where a mouth-eye distance between the first mouth corner and a first eye is normalized by the eye separation distance, and the normalized mouth-eye distance is an additional feature used by the face classification unit.

24. A system, as in claim 20, where a brow-eye distance between a first eyebrow and a first eye is normalized by the eye separation distance, and the normalized brow-eye distance is an additional feature used by the face classification unit.

25. A system, as in claim 20, where a brow distance between the first eyebrow and the second eyebrow is normalized by the eye separation distance, and the normalized brow distance is an additional feature used by the face classification unit.

26. A system, as in claim 1, where one or more normalized characteristic distances is used by the face classification unit classify if the face is neutral.

27. A system, as in claim 26, where the face classification unit is one or more of the following classifiers: neural networks, nearest neighbor methods, Bayesian inference methods, linear discriminant methods, perceptrons, support vector machines, and related variants.

28. A system, as in claim 26, where the face classification unit is neural network (NN).

29. A system, as in claim 1, where the face classification unit is used to enroll one or more subjects in a face-based authentication system with a neutral face.

30. A system, as in claim 1, where the face classification unit is used to authenticate one or more subjects in a face-based authentication system with a neutral face.

31. A system, as in claim 1, used as a user interface that reacts to one or more human emotion states.

32. A system, as in claim 1, used as a surveillance device.

33. A system, as in claim 32, used in one or more of the following: a financial institution, a bank a retail store, a credit card check, a check in, an air port, an air plane boarding check, a building access system, and a object access authorization system.

34. A system, as in claim 1, used as an information retrieval device.

35. A system, as in claim 34, where the information retrieval device includes any one or more of the following: a video retrieval of a frame containing a face image with a specified expression, an image of an image containing a face image with a specified expression.

36. A method for automatically detecting neutral, expressionless face images in digital images, the method comprising the steps of:
 acquiring an image;
 detecting one or more face subimages of one or more faces in the image;
 estimating one or more characteristic facial features as characteristic points in each detected face subimage, one of the characteristic points being a first and a second mouth corner on a mouth of the face;
 detecting one or more contours of one or more facial components;
 determining a mouth shape of the mouth from the contour of the mouth;
 creating a representation of the mouth shape, the mouth being one of the facial components; and
 classifying the representation into one of a neutral class and a non-neutral class.

37. A system for automatically detecting neutral, expressionless face images in digital images, the method comprising:
 means for acquiring an image;
 means for detecting one or more face subimages of one or more faces in the image;
 means for estimating one or more characteristic facial features as characteristic points in each detected face subimage, one of the characteristic points being a first and a second mouth corner on a mouth of the face;
 means for detecting one or more contours of one or more facial components;
 means for determining a mouth shape of the mouth from the contour of the mouth;
 means for creating a representation of the mouth shape, the mouth being one of the facial components; and
 means for classifying the representation into one of a neutral class and a non-neutral class.

38. A program storage device, readable by machine, tangibly embodying a program of instructions executable by the machine to cause the machine to perform a method for automatically detecting neutral, expressionless face images in digital images, the method comprising the steps of:
 acquiring an image;
 detecting one or more face subimages of one or more faces in the image;
 estimating one or more characteristic facial features as characteristic points in each detected face subimage, one of the characteristic points being a first and a second mouth corner on a mouth of the face;
 detecting one or more contours of one or more facial components;
 determining a mouth shape of the mouth from the contour of the mouth;
 creating a representation of the mouth shape, the mouth being one of the facial components; and
 classifying the representation into one of a neutral class and a non-neutral class.

* * * * *